United States Patent
Hannuksela et al.

(10) Patent No.: US 12,495,152 B2
(45) Date of Patent: Dec. 9, 2025

(54) METHOD AND APPARATUS FOR ENCODING, DECODING, OR PROGRESSIVE RENDERING OF IMAGE

(71) Applicant: Nokia Technologies Oy, Espoo (FI)

(72) Inventors: Miska Matias Hannuksela, Tampere (FI); Kashyap Kammachi Sreedhar, Tampere (FI); Alireza Aminlou, Tampere (FI)

(73) Assignee: Nokia Technologies Oy, Espoo (FI)

( * ) Notice: Subject to any disclaimer, the term of this patent is extended or adjusted under 35 U.S.C. 154(b) by 323 days.

(21) Appl. No.: 18/300,073

(22) Filed: Apr. 13, 2023

(65) Prior Publication Data
US 2023/0345024 A1    Oct. 26, 2023

Related U.S. Application Data

(60) Provisional application No. 63/363,267, filed on Apr. 20, 2022.

(51) Int. Cl.
*H04N 19/44*  (2014.01)
*H04N 19/105* (2014.01)
*H04N 19/159* (2014.01)
*H04N 19/172* (2014.01)

(52) U.S. Cl.
CPC .......... *H04N 19/44* (2014.11); *H04N 19/105* (2014.11); *H04N 19/159* (2014.11); *H04N 19/172* (2014.11)

(58) Field of Classification Search
None
See application file for complete search history.

(56) References Cited

U.S. PATENT DOCUMENTS

| 6,233,356 B1 * | 5/2001 | Haskell | H04N 19/31 375/E7.079 |
| 2011/0012994 A1 * | 1/2011 | Park | H04N 21/4382 348/E13.001 |
| 2021/0112233 A1 * | 4/2021 | Hannuksela | H04N 19/70 |

FOREIGN PATENT DOCUMENTS

| GB | 2538997 A | 12/2016 |
| GB | 2538998 A | 12/2016 |

OTHER PUBLICATIONS

Extended European Search Report received for corresponding European Patent Application No. 23168625.4, dated Jun. 20, 2023, 11 pages.

"Technology under Consideration on ISO/IEC 23008-12", WG 03, ISO/IEC JTC1/SC29/WG03, N0332, Jul. 2021, 9 pages.

(Continued)

*Primary Examiner* — Clifford Hilaire
(74) *Attorney, Agent, or Firm* — Nokia Technologies Oy

(57) ABSTRACT

Various embodiments provide example apparatus, method, and computer program product. The example apparatus includes: at least one processor; and at least one non-transitory memory including computer program code; wherein the at least one memory and the computer program code are configured to, with the at least one processor, cause the apparatus at least to: define a derived image item; and define a single stream item property, wherein the single stream item property is used to indicate that input image items of the derived image item are concatenated in encoded domain to obtain a single stream and are to be decoded by a single decoder.

19 Claims, 17 Drawing Sheets

(56) References Cited

OTHER PUBLICATIONS

"Information technology—MPEG systems technologies—Part 12: Image File Format", ISO/IEC 23008-12, Sep. 2022, 9 pages.
"Information Technology—Coding Of Audio-Visual Objects—Part 12: ISO Base Media File Format", ISO/IEC 14496-12, Fifth edition, Dec. 15, 2015, 248 pages.
"Information Technology—Coding Of Audio-Visual Objects—Part 14: MP4 File Format", ISO/IEC 14496-14, First edition, Nov. 15, 2003, 18 pages.
"Information Technology—Coding Of Audio-Visual Objects—Part 15: Advanced Video Coding (AVC) File Format", ISO/IEC 14496-15, First edition, Apr. 15, 2004, 29 pages.
"High Efficiency Video Coding", Series H: Audiovisual And Multimedia Systems, Infrastructure of audiovisual services—Coding of moving video, Recommendation ITU-T H.265, Feb. 2018, 692 pages.
"Video Coding For Low Bit Rate Communication", Series H: Audiovisual And Multimedia Systems, Infrastructure of audiovisual services—Coding of moving Video, ITU-T Recommendation H.263, Jan. 2005, 226 pages.
"Advanced Video Coding For Generic Audiovisual services", Series H: Audiovisual And Multimedia Systems, Infrastructure of audiovisual services—Coding of moving Video, Recommendation ITU-T H.264, Apr. 2017, 812 pages.
"Versatile Video Coding", Series H: Audiovisual and Multimedia Systems Infrastructure of audiovisual services—Coding of moving video, Recommendation ITU-T H.266, Aug. 2020, 516 pages.
"WD of ISO/IEC 23008-12 AMD 1 Support for progressive rendering signaling and other improvements", WG 03, ISO/IEC JTC 1/SC 29/WG03, N0507, May 2023, 10 pages.
Ruellan et al., "[HEIF/MIAF] On progressive decoding", Canon Research Centre France, ISO/IEC JTC1/SC29/WG3 MPEG2021/m56028, Jan. 2021, 4 pages.
Ruellan et al., "(28.2)[HEIF] On progressive decoding", Canon Research Centre France, ISO/IEC JTC1/SC29/WG3 MPEG2021/m56773, Apr. 2021, 6 pages.
Denoual et al., "(29.2) [HEIF] On progressive HEIF rendering", Canon Research Centre France, ISO/IEC JTC1/SC29/WG3 MPEG2021/m57385, Jul. 2021, 13 pages.
Denoual et al., "(28.1) [HEIF] On progressive rendering", Canon Research Centre France, ISO/IEC JTC1/SC29/WG3 MPEG2021/m58106, Oct. 2021, 5 pages.
Denoual et al., "[HEIF] On progressive rendering", Canon Research Centre France, ISO/IEC JTC1/SC29/WG3 m58879, Jan. 2022, 2 pages.
"Information Technology—Generic Coding of Moving Pictures and Associated Audio Information: Systems", Series H: Audiovisual and Multimedia Systems, Infrastructure of Audiovisual Services—Transmission Multiplexing and Synchronization, Recommendation ITU-T H.222.0, Mar. 2017, 291 pages.
"Information technology—Generic coding of moving pictures and associated audio information: Video", Series H: Audiovisual and Multimedia Systems Infrastructure of audiovisual services—Coding of moving video, ITU-T Recommendation H.262, Feb. 2000, 220 pages.
"Information technology—Universal coded character set (UCS)", ISO/IEC 10646, Sixth edition, Dec. 2020, 9 pages.
"IEEE 802.11", Wikipedia, Retrieved on May 10, 2023, Webpage available at : https://en.wikipedia.org/wiki/IEEE_802.11.

\* cited by examiner

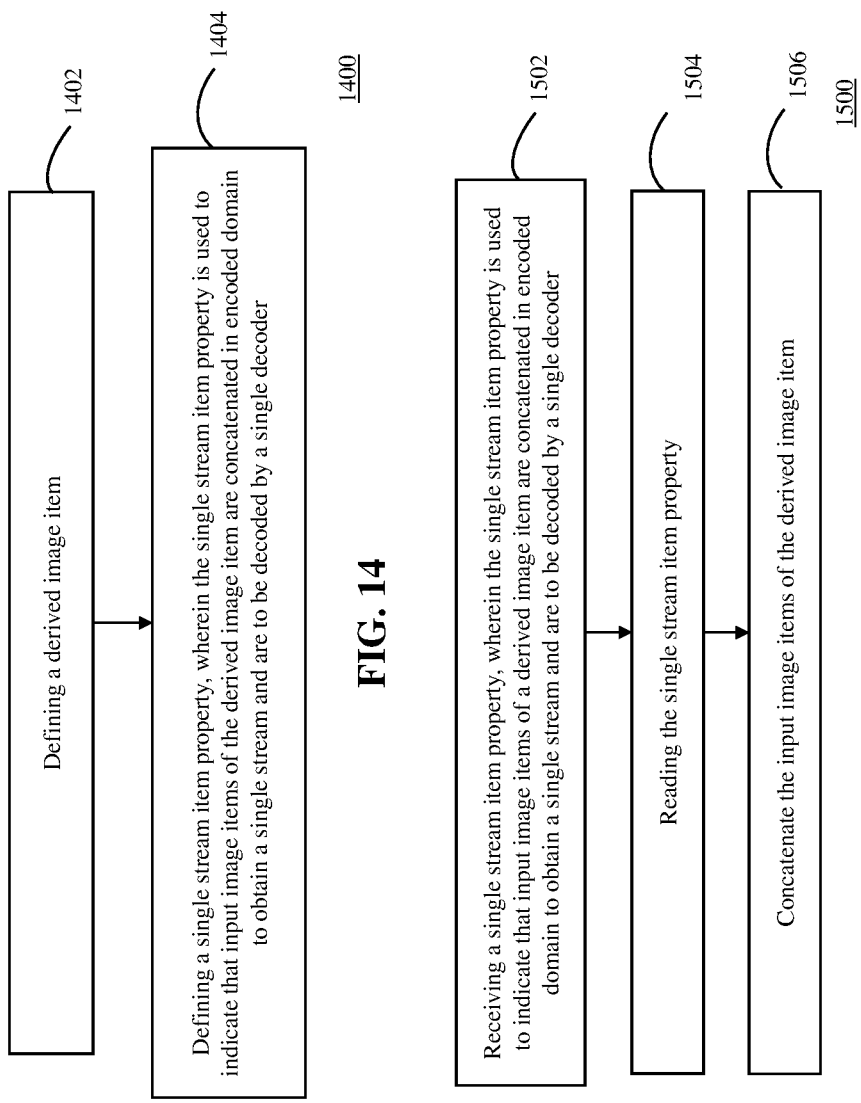

METHOD AND APPARATUS FOR ENCODING, DECODING, OR PROGRESSIVE RENDERING OF IMAGE

TECHNICAL FIELD

The examples and non-limiting embodiments relate generally to multimedia coding and transporting, and more particularly, for encoding, decoding or progressive rendering of an image.

BACKGROUND

It is known to provide standardized formats for signaling of media data.

SUMMARY

An example apparatus includes: at least one processor; and at least one non-transitory memory including computer program code; wherein the at least one memory and the computer program code are configured to, with the at least one processor, cause the apparatus at least to perform: define a derived image item; and define a single stream item property, wherein the single stream item property is used to indicate that input image items of the derived image item are concatenated in encoded domain to obtain a single stream and are to be decoded by a single decoder. In an embodiment, the derived image item are defined in a container file.

The example apparatus may further include, wherein an order in which input image items are listed in an item reference is the order in which the input image items are to be concatenated to obtain the single stream.

The example apparatus may further include, wherein the derived image item comprises a first input image item, and wherein when the first input image item is an encoded image item that is not predictively encoded, the first input image item is added to the single stream.

The example apparatus may further include, wherein the derived image items comprises a second input image item, and wherein when the second input image item is a predictively encoded image item, each of referenced image items of the second input image item is included in the single stream in referencing order, unless a reference image item is already included in the single stream.

The example apparatus may further include, wherein apparatus is further caused to signal or write in a container file information that an output of the input image items is identical to an output of the derived image item associated with a progressive derived image item property.

The example apparatus may further include, wherein the apparatus is further caused to define an identical images entity group, wherein each image comprised in the identical images entity group results into an identical output image.

The example apparatus may further include, wherein the apparatus is caused to use a four character code (4cc) value of 'sstr' as an item property type of the single stream item property.

The example apparatus may further include, wherein the apparatus is caused to define at least one of: an item count for keeping a count of number of input image items that are to be concatenated to form the single stream; or item identifier of the input image items that are to be concatenated to form the single stream.

Another example apparatus includes: at least one processor; and at least one non-transitory memory including computer program code; wherein the at least one memory and the computer program code are configured to, with the at least one processor, cause the apparatus at least to perform: receive a single stream item property, wherein the single stream item property is used to indicate that input image items of a derived image item are concatenated in encoded domain to obtain a single stream and are to be decoded by a single decoder; read the single stream item property; and concatenate the input image items of the derived image item.

The example apparatus may further include, wherein an order in which input image items are listed in an item reference is the order in which the input image items are to be concatenated to obtain the single stream.

The example apparatus may further include, wherein the derived image item comprises a first input image item, and wherein when the first input image item is an encoded image item that is not predictively encoded, the first input image item is added to the single stream.

The example apparatus may further include, wherein the derived image items comprises a second input image item, and wherein when the second input image item is a predictively encoded image item, each of referenced image items of the second input image item is included in the single stream in referencing order, unless a reference image item is already included in the single stream.

An example method includes: defining a derived image item; and defining a single stream item property, wherein the single stream item property is used to indicate that input image items of the derived image item are concatenated in encoded domain to obtain a single stream and are to be decoded by a single decoder. In an embodiment, the derived image item are defined in a container file.

The example method may further include, wherein an order in which input image items are listed in an item reference is the order in which the input image items are to be concatenated to obtain the single stream.

The example method may further include, wherein the derived image item comprises a first input image item, and wherein when the first input image item is an encoded image item that is not predictively encoded, the first input image item is added to the single stream.

The example method may further include, wherein the derived image items comprises a second input image item, and wherein when the second input image item is a predictively encoded image item, each of referenced image items of the second input image item is included in the single stream in referencing order, unless a reference image item is already included in the single stream.

The example method may further include using a four character code (4cc) value of 'sstr' as an item property type of the single stream item property.

Another example method includes: receiving a single stream item property, wherein the single stream item property is used to indicate that input image items of a derived image item are concatenated in encoded domain to obtain a single stream and are to be decoded by a single decoder; reading the single stream item property; and concatenating the input image items of the derived image item.

The example method may further include, wherein an order in which input image items are listed in an item reference is the order in which the input image items are to be concatenated to obtain the single stream.

The example method may further include, wherein the derived image item comprises a first input image item, and wherein when the first input image item is an encoded image item that is not predictively encoded, the first input image item is added to the single stream.

The example method may further include, wherein the derived image items comprises a second input image item, and wherein when the second input image item is a predictively encoded image item, each of referenced image items of the second input image item is included in the single stream in referencing order, unless a reference image item is already included in the single stream.

Another example apparatus includes: at least one processor; and at least one non-transitory memory including computer program code; wherein the at least one memory and the computer program code are configured to, with the at least one processor, cause the apparatus at least to perform: encode an image into a plurality of representations, wherein each representation of the plurality of representations comprises at least of one a different quality or resolution from other representations, and wherein at least one representation of the plurality of representations is encoded independently from the other representations, and wherein the at least one independently encoded representation comprises a first resolution or quality of the plurality of representations, and wherein the plurality of representations comprises at least one representation comprising a second resolution or quality of the plurality of representations, and wherein the second resolution or quality is higher than the first resolution or quality, and the at least one image with the second resolution or quality is divided into or comprises multiple regions; and encode one or more regions of the multiple regions of the at least one image with the second resolution or quality into two or more encoded pictures based or dependent at least on the at least one independently encoded representation.

The example apparatus may further include, wherein the apparatus is further caused to use a scaling window to encode one or more of the multiple regions.

The example apparatus may further include, wherein the at least one independently encoded representation is encoded as a first picture of a bitstream.

The example apparatus may further include, wherein the apparatus is further caused to encapsulate each encoded representation or region in an image item.

The example apparatus may further include, wherein the apparatus is further caused to write a derived image item in a container file, wherein the derived image item comprises an overlay derived image item or a grid derived image item, and wherein the overlay derived image item or the grid derived image item refer to image items and predictively encoded image items in progressive rendering order or use the image items and the predictively encoded image items in progressive rendering order as an input.

The example apparatus may further include, wherein the apparatus is further caused to signal or write, in the container file, a progressive derived image item property based on the overlay derived image item or the grid derived image item.

The example apparatus may further include, wherein the one or more representations of the plurality of representation or the one or more regions provided as an input to the overlay derived image item or the grid derived image item form a rendering step.

The example apparatus may further include, wherein the apparatus is further caused to signal or write information in the container file that a single decoder is capable of decoding the plurality of representations.

The example apparatus may further include, wherein the apparatus is further caused to define a single stream item property used to indicate that input images of a derived image item are concatenated in encoded domain and are to be decoded by the single decoder without any reinitialization of the single decoder.

The example apparatus may further include, wherein the apparatus is further caused to concatenate the input images of the derived image item, and wherein to concatenate the input images, the apparatus is further caused to add each input image item of the derived image item into a bitstream in the order of the input images in a process comprising the following: when the input image item is an encoded image item that is not predictively encoded, the input image item is added to the bitstream; when the input image item is a derived image item, the process is executed recursively; when an input image item is a predictively encoded image item, referenced image items are included in the bitstream in referencing order; and when the referenced image items are predictively encoded image items, the process is executed recursively.

The example apparatus may further include, wherein in apparatus is further caused to signal or write in a container file the information that an output of the image items is identical to an output of the derived image item associated with the progressive derived image item property.

The example apparatus may further include, wherein the apparatus is further caused to define an identical images entity group, wherein each image comprised in the identical images entity group results into an identical output image.

The example apparatus may further include, wherein the apparatus is further caused to define a grid derived image item using a one or more subpicture image items, wherein the grid derived image item is based at least on the plurality of representations.

The example apparatus may further include, wherein the apparatus is further caused to associate the progressive derived image item property with the grid derived image item to indicate that the one or more subpicture image items are in progressive rendering order.

The example apparatus may further include, wherein the one or more subpicture image items comprise one or more versatile video coding standard (VVC) subpicture image items.

The example apparatus may further include, wherein a VVC base item comprises the one or more VVC subpicture image items by reference.

The example apparatus may further include, wherein the identical image entry group comprises the derived image item and the VVC base item.

The example apparatus may further include, wherein the apparatus is further caused to signal or write a single copy of the at least one independently encoded representation in a container file.

The example apparatus may further include, wherein the image item comprises an image item of a high efficiency image file format file.

The example apparatus may further include, wherein the container file comprises a high efficiency image file format container file.

The example apparatus may further include, wherein the apparatus is further caused to provide or transmit the plurality of encoded representations to a decoder.

Another example apparatus includes: at least one processor; and at least one non-transitory memory including computer program code; wherein the at least one memory and the computer program code are configured to, with the at least one processor, cause the apparatus at least to perform: write a derived image item in a container file, wherein the derived image item comprises an overlay derived image item or a grid derived image item, and wherein the overlay derived image item or the grid derived image item refer to image items and predictively encoded image items in progressive rendering order or use the image items and the predictively encoded image items in progressive rendering order as an input, wherein one or more representations of a plurality of representations of an image or one or more regions of a representation of the plurality of representations are provided as an input to the overlay derived image item or the grid derived image item form a rendering step; and signal or write information in the container file that a single decoder is capable of decoding the plurality of representations.

The example apparatus may further include, wherein the apparatus is further caused to define or write in the container a single stream item property used to indicate that input images of a derived image item are concatenated in encoded domain and are to be decoded by the single decoder without any reinitialization of the single decoder.

The example apparatus may further include, wherein the single stream item property indicates that to concatenate the input images of the derived image item, each input image item of the derived image item is added into a bitstream in the order of the input images in a process comprising the following: when the input image item is an encoded image item that is not predictively encoded, the input image item is added to the bitstream; when the input image item is a derived image item, the process is executed recursively; when an input image item is a predictively encoded image item, referenced image items are included in the bitstream in referencing order; and when the referenced image items are predictively encoded image items, the process is executed recursively.

The example apparatus may further include, wherein the apparatus is further caused to: receive or obtain a plurality of representations of an encoded image, wherein each representation of the plurality of representations comprises at least of one a different quality or resolution from other representations, and wherein at least one representation of the plurality of representations is encoded independently from the other representations, and wherein the at least one independently encoded representation comprises a first resolution or quality of the plurality of representations, and wherein the plurality of representations comprises at least one representation comprising a second resolution or quality of the plurality of representations, and the at least one image with the second resolution or quality is divided into or comprises multiple regions; and receive or obtain one or more regions of the multiple regions of the at least one image with the second resolution or quality is encoded as two or more encoded pictures based or dependent at least on the at least one independently encoded representation.

The example apparatus may further include, wherein one or more of the multiple regions use a scaling window.

The example apparatus may further include, wherein the at least one independently encoded representation is encoded as a first picture of the bitstream.

The example apparatus may further include, wherein the apparatus is further caused to encapsulate each encoded representation or region in an image item.

Yet another example apparatus includes: at least one processor; and at least one non-transitory memory including computer program code; wherein the at least one memory and the computer program code are configured to, with the at least one processor, cause the apparatus at least to perform: receive a container file; read the container file, wherein the container file comprises a derived image item, and wherein the derived image item comprises an overlay derived image item or a grid derived image item, and wherein the overlay derived image item or the grid derived image item refer to image items and predictively encoded image items in progressive rendering order or use the image items and the predictively encoded image items in progressive rendering order as an input, and wherein one or more representations of a plurality of representations of an image or one or more regions of a representation of the plurality of representations are provided as an input to the overlay derived image item or the grid derived image item form a rendering step; read information from the container file when a single decoder is capable of decoding the plurality of representations; and decode at least one representation of the plurality of representations.

The example apparatus may further include, wherein in absence of a single stream item property, the apparatus is further caused to: decode each input image of the derived image item separately; and decode the at least one independently encoded image multiple times.

The example apparatus may further include, wherein the apparatus is further caused to process an image item from an identical image entity group, wherein each image comprised in the identical images entity group results into an identical output image.

The example apparatus may further include, wherein the apparatus is further caused to select the derived image item, with an associated progressive derived image item property, for progressive rendering.

The example apparatus may further include, wherein in the presence of a single stream item property, the apparatus is further caused to: concatenate input images of the derived image item in encoded domain; decode the concatenated input images by the single decoder without any reinitialization of the single decoder; and add each input image item of the derived image item into a bitstream in the order of the input images in a process comprising the following: when the input image item is an encoded image item that is not predictively encoded, the input image item is added to the bitstream; when the input image item is a derived image item, the process is executed recursively; when an input image item is a predictively encoded image item, referenced image items are included in the bitstream in referencing order; and when the referenced image items are predictively encoded image items, the process is executed recursively.

Still another example apparatus includes: at least one processor; and at least one non-transitory memory including computer program code; wherein the at least one memory and the computer program code are configured to, with the at least one processor, cause the apparatus at least to perform: receive a plurality of encoded representations of an image, wherein each representation of the plurality of representations comprises at least of one a different quality or resolution from other representations, and wherein at least one representation of the plurality of representations is encoded independently from the other representations, and wherein the at least one independently encoded representation comprises a first resolution or quality of the plurality of representations, and wherein the plurality of representations comprises at least one representation comprising a second resolution or quality of the plurality of representations, and wherein the at least one image with the second resolution or quality is divided into or comprises multiple regions, and wherein one or more regions of the multiple regions of the at least one image with second resolution or quality are encoded into two or more encoded pictures based or dependent at least on the at least one independently encoded representation; and decode at least one representation of the plurality of representations.

An example method includes: encoding an image into a plurality of representations, wherein each representation of the plurality of representations comprises at least of one a different quality or resolution from other representations, and wherein at least one representation of the plurality of representations is encoded independently from the other representations, and wherein the at least one independently encoded representation comprises a first resolution or quality of the plurality of representations, and wherein the plurality of representations comprises at least one representation comprising a second resolution or quality of the plurality of representations, and wherein the second resolution or quality is higher than the first resolution or quality, and the at least one image with the second resolution or quality is divided into or comprises multiple regions; and encoding one or more regions of the multiple regions of the at least one image with the second resolution or quality into two or more encoded pictures based or dependent at least on the at least one independently encoded representation.

The example method may further include using a scaling window to encode one or more of the multiple regions.

The example method may further include, wherein the at least one independently encoded representation is encoded as a first picture of a bitstream.

The example method may further include encapsulating each encoded representation or region in an image item.

The example method may further include writing a derived image item in a container file, wherein the derived image item comprises an overlay derived image item or a grid derived image item, and wherein the overlay derived image item or the grid derived image item refer to or use image items and predictively encoded image items in progressive rendering order as an input.

The example method may further include signaling or writing, in the container file, a progressive derived image item property based on the overlay derived image item or the grid derived image item.

The example method may further include, wherein the one or more representations of the plurality of representation or the one or more regions provided as an input to the overlay derived image item or the grid derived image item form a rendering step.

The example method may further include signaling or writing information in the container file that a single decoder is capable of decoding the plurality of representations.

The example method may further include defining a single stream item property used to indicate that input images of a derived image item are concatenated in encoded domain and are to be decoded by the single decoder without any reinitialization of the single decoder.

The example method may further include concatenating the input images of the derived image item, and wherein to concatenate the input images, the method further comprising adding each input image item of the derived image item into a bitstream in the order of the input images in a process comprising the following: when the input image item is an encoded image item that is not predictively encoded, the input image item is added to the bitstream; when the input image item is a derived image item, the process is executed recursively; when an input image item is a predictively encoded image item, referenced image items are included in the bitstream in referencing order; and when the referenced image items are predictively encoded image items, the process is executed recursively.

The example method may further include signaling or writing in a container file the information that an output of the image items is identical to an output of the derived image item associated with the progressive derived image item property.

The example method may further include defining an identical images entity group, wherein each image comprised in the identical images entity group results into an identical output image.

The example method may further include defining a grid derived image item using a one or more subpicture image items, wherein the grid derived image item is based at least on the plurality of representations.

The example method may further include associating the progressive derived image item property with the grid derived image item to indicate that the one or more subpicture image items are in progressive rendering order.

The example method may further include, wherein the one or more subpicture image items comprise one or more versatile video coding standard (VVC) subpicture image items.

The example method may further include, wherein a VVC base item comprises the one or more VVC subpicture image items by reference.

The example method may further include, wherein the identical image entry group comprises the derived image item and the VVC base item.

The example method may further include signaling or writing a single copy of the at least one independently encoded representation in a container file.

The example method may further include, wherein the image item comprises an image item of a high efficiency image file format file.

The example method may further include, wherein the container file comprises a high efficiency image file format container file.

The example method may further include providing or transmitting the plurality of encoded representations to a decoder.

Another example method includes: writing a derived image item in a container file, wherein the derived image item comprises an overlay derived image item or a grid derived image item, and wherein the overlay derived image item or the grid derived image item refer to image items and predictively encoded image items in progressive rendering order or use the image items and the predictively encoded image items in progressive rendering order as an input, wherein one or more representations of a plurality of representations of an image or one or more regions of a representation of the plurality of representations are provided as an input to the overlay derived image item or the grid derived image item form a rendering step; and signaling or writing information in the container file that a single decoder is capable of decoding the plurality of representations.

The example method may further include defining or writing in the container a single stream item property used to indicate that input images of a derived image item are concatenated in encoded domain and are to be decoded by the single decoder without any reinitialization of the single decoder.

The example method may further include, wherein the single stream item property indicates that to concatenate the input images of the derived image item, each input image item of the derived image item is added into a bitstream in the order of the input images in a process comprising the following: when the input image item is an encoded image item that is not predictively encoded, the input image item is added to the bitstream; when the input image item is a derived image item, the process is executed recursively; when an input image item is a predictively encoded image item, referenced image items are included in the bitstream in referencing order; and when the referenced image items are predictively encoded image items, the process is executed recursively.

The example method may further include: receiving or obtaining a plurality of representations of an encoded image, wherein each representation of the plurality of representations comprises at least of one a different quality or resolution from other representations, and wherein at least one representation of the plurality of representations is encoded independently from the other representations, and wherein the at least one independently encoded representation comprises a first resolution or quality of the plurality of representations, and wherein the plurality of representations comprises at least one representation comprising a second resolution or quality of the plurality of representations, and the at least one image with the second resolution or quality is divided into or comprises multiple regions; and receiving or obtaining one or more regions of the multiple regions of the at least one image with the second resolution or quality is encoded as two or more encoded pictures based or dependent at least on the at least one independently encoded representation.

The example method may further include, wherein one or more of the multiple regions use a scaling window.

The example method may further include, wherein the at least one independently encoded representation is encoded as a first picture of the bitstream.

The example method may further include encapsulating each encoded representation or region in an image item.

Yet another example method includes: receiving a container file; reading the container file, wherein the container file comprises a derived image item, and wherein the derived image item comprises an overlay derived image item or a grid derived image item, and wherein the overlay derived image item or the grid derived image item refer to image items and predictively encoded image items in progressive rendering order or use the image items and the predictively encoded image items in progressive rendering order as an input, and wherein one or more representations of a plurality of representations of an image or one or more regions of a representation of the plurality of representations are provided as an input to the overlay derived image item or the grid derived image item form a rendering step; reading information from the container file when a single decoder is capable of decoding the plurality of representations; and decoding at least one representation of the plurality of representations.

The example method may further include, wherein in absence of a single stream item property, the method further includes: decoding each input image of the derived image item separately; and decoding the at least one independently encoded image multiple times.

The example method may further include processing an image item from an identical image entity group, wherein each image comprised in the identical images entity group results into an identical output image.

The example method may further include selecting the derived image item, with an associated progressive derived image item property, for progressive rendering.

The example method may further include, wherein in the presence of a single stream item property, the method is further includes: concatenating input images of the derived image item in encoded domain; decoding the concatenated input images by the single decoder without any reinitialization of the single decoder; and add each input image item of the derived image item into a bitstream in the order of the input images in a process comprising the following: when the input image item is an encoded image item that is not predictively encoded, the input image item is added to the bitstream; when the input image item is a derived image item, the process is executed recursively; when an input image item is a predictively encoded image item, referenced image items are included in the bitstream in referencing order; and when the referenced image items are predictively encoded image items, the process is executed recursively.

Still another example method includes: receiving a plurality of encoded representations of an image, wherein each representation of the plurality of representations comprises at least of one a different quality or resolution from other representations, and wherein at least one representation of the plurality of representations is encoded independently from the other representations, and wherein the at least one independently encoded representation comprises a first resolution or quality of the plurality of representations, and wherein the plurality of representations comprises at least one representation comprising a second resolution or quality of the plurality of representations, and wherein the at least one image with the second resolution or quality is divided into or comprises multiple regions, and wherein one or more regions of the multiple regions of the at least one image with second resolution or quality are encoded into two or more encoded pictures based or dependent at least on the at least one independently encoded representation; and decoding at least one representation of the plurality of representations.

An example computer readable medium includes program instructions for causing an apparatus to perform at least the following: encode an image into a plurality of representations, wherein each representation of the plurality of representations comprises at least of one a different quality or resolution from other representations, and wherein at least one representation of the plurality of representations is encoded independently from the other representations, and wherein the at least one independently encoded representation comprises a first resolution or quality of the plurality of representations, and wherein the plurality of representations comprises at least one representation comprising a second resolution of the plurality of representations, and wherein the second resolution or quality is higher than the first resolution or quality, and the at least one image with the second resolution or quality is divided into or comprises multiple regions; and encode one or more regions of the multiple regions of the at least one image with the second resolution or quality into two or more encoded pictures based or dependent at least on the at least one independently encoded representation.

The example computer readable medium may further include, wherein the computer readable medium comprises a non-transitory computer readable medium.

The example computer readable medium may further include, wherein the computer readable medium further causes the apparatus to perform the methods as described in one or more of the previous paragraphs.

Another example computer readable medium includes program instructions for causing an apparatus to perform at least the following: write a derived image item in a container file, wherein the derived image item comprises an overlay derived image item or a grid derived image item, and wherein the overlay derived image item or the grid derived image item refer to image items and predictively encoded image items in progressive rendering order or use the image items and the predictively encoded image items in progressive rendering order as an input, wherein one or more representations of a plurality of representations of an image or one or more regions of a representation of the plurality of representations are provided as an input to the overlay derived image item or the grid derived image item form a rendering step; and signal or write information in the container file that a single decoder is capable of decoding the plurality of representations.

The example computer readable medium may further include, wherein the computer readable medium comprises a non-transitory computer readable medium.

The example computer readable medium may further include, wherein the computer readable medium further causes the apparatus to perform the methods as described in one or more of the previous paragraphs.

Yet another example computer readable medium includes program instructions for causing an apparatus to perform at least the following: receive a container file; read the container file, wherein the container file comprises a derived image item, and wherein the derived image item comprises an overlay derived image item or a grid derived image item, and wherein the overlay derived image item or the grid derived image item refer to image items and predictively encoded image items in progressive rendering order or use the image items and the predictively encoded image items in progressive rendering order as an input, and wherein one or more representations of a plurality of representations of an image or one or more regions of a representation of the plurality of representations are provided as an input to the overlay derived image item or the grid derived image item form a rendering step; read information from the container file if a single decoder is capable of decoding the plurality of representations; and decode at least one representation of the plurality of representations.

The example computer readable medium may further include, wherein the computer readable medium comprises a non-transitory computer readable medium.

The example computer readable medium may further include, wherein the computer readable medium further causes the apparatus to perform the methods as claimed described in one or more of the previous paragraphs.

Still another example computer readable medium comprising program instructions for causing an apparatus to perform at least the following: receive a plurality of encoded representations of an image, wherein each representation of the plurality of representations comprises at least of one a different quality or resolution from other representations, and wherein at least one representation of the plurality of representations is encoded independently from the other representations, and wherein the at least one independently encoded representation comprises a first resolution or quality of the plurality of representations, and wherein the plurality of representations comprises at least one representation comprising a second resolution or quality of the plurality of representations, and wherein the at least one image with the second resolution or quality is divided into or comprises multiple regions, and wherein one or more regions of the multiple regions of the at least one image with second resolution or quality are encoded into two or more encoded pictures based or dependent at least on the at least one independently encoded representation; and decode at least one representation of the plurality of representations.

The example computer readable medium may further include, wherein the computer readable medium comprises a non-transitory computer readable medium.

Still another apparatus includes: means for encoding an image into a plurality of representations, wherein each representation of the plurality of representations comprises at least of one a different quality or resolution from other representations, and wherein at least one representation of the plurality of representations is encoded independently from the other representations, and wherein the at least one independently encoded representation comprises a first resolution or quality of the plurality of representations, and wherein the plurality of representations comprises at least one representation comprising a second resolution of the plurality of representations, and wherein the second resolution or quality is higher than the first resolution or quality, and the at least one image with the second resolution or quality is divided into or comprises multiple regions; and means for encoding one or more regions of the multiple regions of the at least one image with the second resolution or quality into two or more encoded pictures based or dependent at least on the at least one independently encoded representation.

The example apparatus may further include, wherein the apparatus further comprises means for performing the methods as described in one or more of the previous paragraphs.

Still another example apparatus includes: means for writing a derived image item in a container file, wherein the derived image item comprises an overlay derived image item or a grid derived image item, and wherein the overlay derived image item or the grid derived image item refer to image items and predictively encoded image items in progressive rendering order or use the image items and the predictively encoded image items in progressive rendering order as an input, wherein one or more representations of a plurality of representations of an image or one or more regions of a representation of the plurality of representations are provided as an input to the overlay derived image item or the grid derived image item form a rendering step; and means for signaling or writing information in the container file that a single decoder is capable of decoding the plurality of representations.

The example apparatus may further include, wherein the apparatus further comprises means for performing the methods as described in one or more of the previous paragraphs.

Still another example apparatus includes: means for receiving a container file; means for reading the container file, wherein the container file comprises a derived image item, and wherein the derived image item comprises an overlay derived image item or a grid derived image item, and wherein the overlay derived image item or the grid derived image item refer to image items and predictively encoded image items in progressive rendering order or use the image items and the predictively encoded image items in progressive rendering order as an input, and wherein one or more representations of a plurality of representations of an image or one or more regions of a representation of the plurality of representations are provided as an input to the overlay derived image item or the grid derived image item form a rendering step; means for reading information from the container file if a single decoder is capable of decoding the plurality of representations; and means for decoding at least one representation of the plurality of representations.

The example apparatus may further include, wherein the apparatus further comprises means for performing the methods as described in one or more of the previous paragraphs.

Still another example apparatus includes: means for receiving a plurality of encoded representations of an image, wherein each representation of the plurality of representations comprises at least of one a different quality or resolution from other representations, and wherein at least one representation of the plurality of representations is encoded independently from the other representations, and wherein the at least one independently encoded representation comprises a first resolution or quality of the plurality of representations, and wherein the plurality of representations comprises at least one representation comprising a second resolution or quality of the plurality of representations, and wherein the at least one image with the second resolution or quality is divided into or comprises multiple regions, and wherein one or more regions of the multiple regions of the at least one image with second resolution or quality are encoded into two or more encoded pictures based or dependent at least on the at least one independently encoded representation; and means for decoding at least one representation of the plurality of representations.

BRIEF DESCRIPTION OF THE DRAWINGS

The foregoing aspects and other features are explained in the following description, taken in connection with the accompanying drawings, wherein:

FIG. 14 is an example method for encoding an image, in accordance with another embodiment.

FIG. 15 is another example method for decoding an image, in accordance with another embodiment.

DETAILED DESCRIPTION OF EXAMPLE EMBODIMENTS

Figure 1:
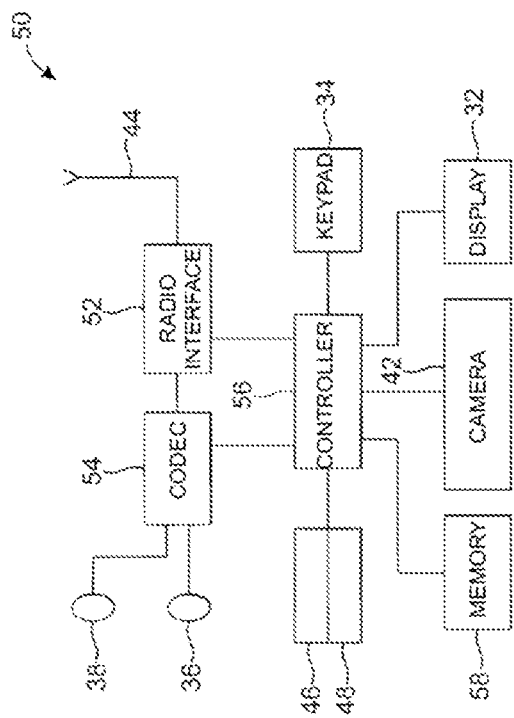
FIG. 1 shows schematically an electronic device employing embodiments of the examples described herein.

The following acronyms and abbreviations that may be found in the specification and/or the drawing figures are defined as follows:

3GP 3GPP file format
3GPP 3rd Generation Partnership Project
3GPP TS 3GPP technical specification
4CC four character code
4G fourth generation of broadband cellular network technology
5G fifth generation cellular network technology
5GC 5G core network
ACC accuracy
AI artificial intelligence
AIoT AI-enabled IoT
a.k.a. also known as
AMF access and mobility management function
AVC advanced video coding
CABAC context-adaptive binary arithmetic coding
CDMA code-division multiple access
CDN content delivery network
CE core experiment
CU central unit
DASH dynamic adaptive streaming over HTTP
DCT discrete cosine transform
DSP digital signal processor
DU distributed unit
EBML extensible binary meta language
EDRAP extended dependent random access point
eNB (or eNodeB) evolved Node B (for example, an LTE base station)
EN-DC E-UTRA-NR dual connectivity
en-gNB or En-gNB node providing NR user plane and control plane protocol terminations towards the UE, and acting as secondary node in EN-DC
EST external stream track
E-UTRA evolved universal terrestrial radio access, for example, the LTE radio access technology
FDMA frequency division multiple access
f(n) fixed-pattern bit string using n bits written (from left to right) with the left bit first.
F1 or F1-C interface between CU and DU control interface
gNB (or gNodeB) base station for 5G/NR, for example, a node providing NR user plane and control plane protocol terminations towards the UE, and connected via the NG interface to the 5GC
GOP group of picture
GSM Global System for Mobile communications
H.222.0 MPEG-2 Systems is formally known as ISO/IEC 13818-1 and as ITU-T Rec. H.222.0
H.26x family of video coding standards in the domain of the ITU-T
HLS high level syntax
HRD hypothetical reference decoder
HTTP hypertext transfer protocol
IBC intra block copy
ID identifier
IEC International Electrotechnical Commission
IEEE Institute of Electrical and Electronics Engineers
I/F interface
IMD integrated messaging device
IMS instant messaging service
IoT internet of things
IP internet protocol
ISO International Organization for Standardization
ISOBMFF ISO base media file format
ITU International Telecommunication Union
ITU-T ITU Telecommunication Standardization Sector
JPEG joint photographic experts group
JVT joint video team
LTE long-term evolution
LZMA Lempel-Ziv-Markov chain compression LZMA2 simple container format that can include both uncompressed data and LZMA data
LZO Lempel-Ziv-Oberhumer compression
LZW Lempel-Ziv-Welch compression
MAC medium access control
mdat MediaDataBox
MME mobility management entity
MMS multimedia messaging service
moov MovieBox
MP4 file format for MPEG-4 Part 14 files
MPEG moving picture experts group
MPEG-2 H.222/H.262 as defined by the ITU
MPEG-4 audio and video coding standard for ISO/IEC 14496
MSB most significant bit
MVC multiview video coding
NAL network abstraction layer
NDU NN compressed data unit
ng or NG new generation
ng-eNB or NG-eNB new generation eNB
NN neural network
NNEF neural network exchange format
NNR neural network representation
NR new radio (5G radio)
N/W or NW network
ONNX Open Neural Network eXchange
PB protocol buffers
PC personal computer
PDA personal digital assistant
PDCP packet data convergence protocol
PHY physical layer
PID packet identifier
PLC power line communication
PNG portable network graphics
PSNR peak signal-to-noise ratio
RAM random access memory
RAP random access point
RAN radio access network
RFC request for comments
RFID radio frequency identification
RLC radio link control
RRC radio resource control
RRH remote radio head
RU radio unit
Rx receiver
SAP stream access point
SDAP service data adaptation protocol
SGW serving gateway
SMF session management function
SMS short messaging service
st(v) null-terminated string encoded as UTF-8 characters as specified in ISO/IEC 10646
SVC scalable video coding
S1 interface between eNodeBs and the EPC
TCP-IP transmission control protocol-internet protocol
TDMA time divisional multiple access
trak TrackBox
TS transport stream
TUC technology under consideration
TV television
Tx transmitter
UE user equipment
ue(v) unsigned integer Exp-Golomb-coded syntax element with the left bit first
UICC Universal Integrated Circuit Card
UMTS Universal Mobile Telecommunications System
u(n) unsigned integer using n bits
UPF user plane function
URI uniform resource identifier
URL uniform resource locator
UTF-8 8-bit Unicode Transformation Format
VCEG video coding experts group
VCL video coding layer
WLAN wireless local area network
X2 interconnecting interface between two eNodeBs in LTE network
Xn interface between two NG-RAN nodes Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms 'data', 'content', 'information', and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a 'computer-readable storage medium', which refers to a non-transitory physical storage medium (e.g., volatile or non-volatile memory device), can be differentiated from a 'computer-readable transmission medium', which refers to an electromagnetic signal.

A method, apparatus and computer program product are provided in accordance with an example embodiment to implement mechanisms for, encoding, decoding, or progressive rendering of an image.

Figure 2:
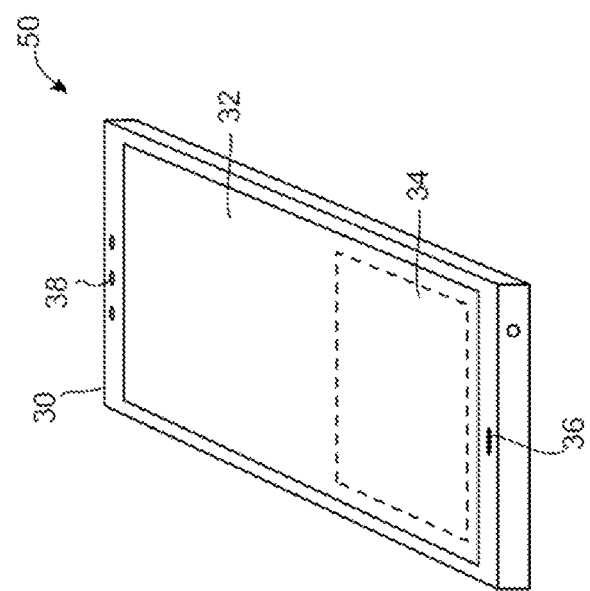
FIG. 2 shows schematically a user equipment suitable for employing embodiments of the examples described herein.

The following describes in detail suitable apparatus and possible mechanisms for encoding, decoding, or progressive rendering in an image according to various embodiments. In this regard reference is first made to FIG. 1 and FIG. 2, where FIG. 1 shows an example block diagram of an apparatus 50. The apparatus may be an Internet of Things (IoT) apparatus configured to perform various functions, for example, gathering information by one or more sensors, receiving or transmitting information, analyzing information gathered or received by the apparatus, or the like. The apparatus may comprise a video coding system, which may incorporate a codec. FIG. 2 shows a layout of an apparatus according to an example embodiment. The elements of FIG. 1 and FIG. 2 will be explained next.

The electronic device 50 may for example be a mobile terminal or user equipment of a wireless communication system, a sensor device, a tag, or a lower power device. However, it would be appreciated that embodiments of the examples described herein may be implemented within any electronic device or apparatus.

The apparatus 50 may comprise a housing 30 for incorporating and protecting the device. The apparatus 50 may further comprise a display 32, for example, in the form of a liquid crystal display, light emitting diode display, organic light emitting diode display, and the like. In other embodiments of the examples described herein the display may be any suitable display technology suitable to display media or multimedia content, for example, an image or a video. The apparatus 50 may further comprise a keypad 34. In other embodiments of the examples described herein any suitable data or user interface mechanism may be employed. For example, the user interface may be implemented as a virtual keyboard or data entry system as part of a touch-sensitive display.

The apparatus may comprise a microphone 36 or any suitable audio input which may be a digital or analogue signal input. The apparatus 50 may further comprise an audio output device which in embodiments of the examples described herein may be any one of: an earpiece 38, speaker, or an analogue audio or digital audio output connection. The apparatus 50 may also comprise a battery (or in other embodiments of the examples described herein the device may be powered by any suitable mobile energy device such as solar cell, fuel cell or clockwork generator). The apparatus may further comprise a camera capable of recording or capturing images and/or video. The apparatus 50 may further comprise an infrared port for short range line of sight communication to other devices. In other embodiments the apparatus 50 may further comprise any suitable short range communication solution such as for example a Bluetooth wireless connection or a USB/firewire wired connection.

The apparatus 50 may comprise a controller 56, a processor or a processor circuitry for controlling the apparatus 50. The controller 56 may be connected to a memory 58 which in embodiments of the examples described herein may store both data in the form of an image, audio data, video data, and/or may also store instructions for implementation on the controller 56. The controller 56 may further be connected to codec circuitry 54 suitable for carrying out coding and/or decoding of audio, image, and/or video data or assisting in coding and/or decoding carried out by the controller.

The apparatus 50 may further comprise a card reader 48 and a smart card 46, for example, a UICC and UICC reader for providing user information and being suitable for providing authentication information for authentication and authorization of the user at a network.

The apparatus 50 may comprise radio interface circuitry 52 connected to the controller and suitable for generating wireless communication signals, for example, for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and/or for receiving radio frequency signals from other apparatus(es).

The apparatus 50 may comprise a camera 42 capable of recording or detecting individual frames which are then passed to the codec 54 or the controller for processing. The apparatus may receive the video image data for processing from another device prior to transmission and/or storage. The apparatus 50 may also receive either wirelessly or by a wired connection the image for coding/decoding. The structural elements of apparatus 50 described above represent examples of means for performing a corresponding function.

Figure 3:
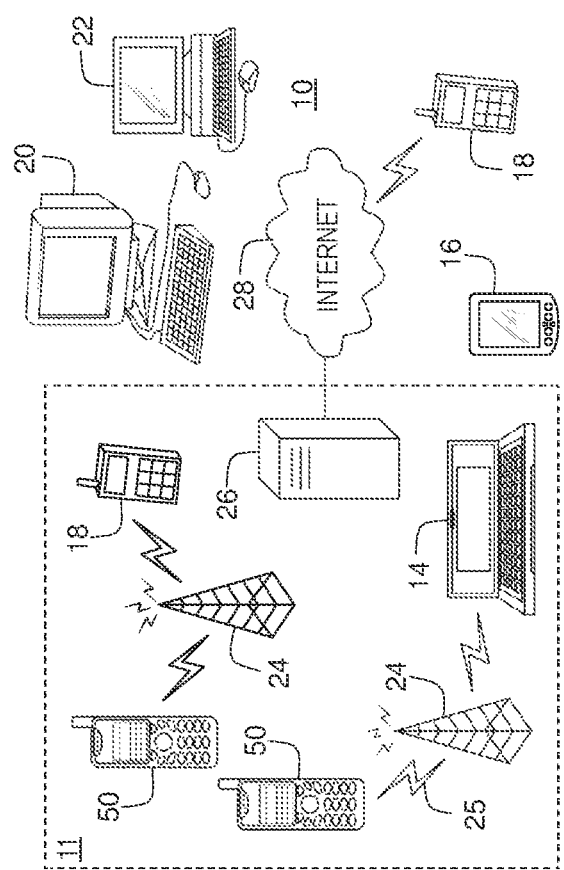
FIG. 3 further shows schematically electronic devices employing embodiments of the examples described herein connected using wireless and wired network connections.

With respect to FIG. 3, an example of a system within which embodiments of the examples described herein can be utilized is shown. The system 10 comprises multiple communication devices which can communicate through one or more networks. The system 10 may comprise any combination of wired or wireless networks including, but not limited to, a wireless cellular telephone network (such as a GSM, UMTS, CDMA, LTE, 4G, 5G network, and the like), a wireless local area network (WLAN) such as defined by any of the IEEE 802.x standards, a Bluetooth® personal area network, an Ethernet local area network, a token ring local area network, a wide area network, and the Internet.

The system 10 may include both wired and wireless communication devices and/or apparatus 50 suitable for implementing embodiments of the examples described herein.

For example, the system shown in FIG. 3 shows a mobile telephone network 11 and a representation of the Internet 28. Connectivity to the Internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

The embodiments may also be implemented in a set-top box; for example, a digital TV receiver, which may/may not have a display or wireless capabilities, in tablets or (laptop) personal computers (PC), which have hardware and/or software to process neural network data, in various operating systems, and in chipsets, processors, DSPs and/or embedded systems offering hardware/software based coding.

Some or further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11, 3GPP Narrowband IoT and any similar wireless communication technology. A communications device involved in implementing various embodiments of the examples described herein may communicate using various media including, but not limited to, radio, infrared, laser, cable connections, and any suitable connection.

In telecommunications and data networks, a channel may refer either to a physical channel or to a logical channel. A physical channel may refer to a physical transmission medium such as a wire, whereas a logical channel may refer to a logical connection over a multiplexed medium, capable of conveying several logical channels. A channel may be used for conveying an information signal, for example a bitstream, from one or several senders (or transmitters) to one or several receivers.

The embodiments may also be implemented in internet of things (IoT) devices. The IoT may be defined, for example, as an interconnection of uniquely identifiable embedded computing devices within the existing Internet infrastructure. The convergence of various technologies has and may enable many fields of embedded systems, such as wireless sensor networks, control systems, home/building automation, and the like, to be included the IoT. In order to utilize the Internet, IoT devices are provided with an IP address as a unique identifier. The IoT devices may be provided with a radio transmitter, such as WLAN or Bluetooth® transmitter or an RFID tag. Alternatively, IoT devices may have access to an IP-based network via a wired network, such as an Ethernet-based network or a power-line connection (PLC).

The devices/systems described in FIGS. 1 to 3 encoding, decoding, signalling, and/or transporting of an image file format, in accordance with various embodiments.

An MPEG-2 transport stream (TS), specified in ISO/IEC 13818-1 or equivalently in ITU-T Recommendation H.222.0, is a format for carrying audio, video, and other media as well as program metadata or other metadata, in a multiplexed stream. A packet identifier (PID) is used to identify an elementary stream (a.k.a. packetized elementary stream) within the TS. Hence, a logical channel within an MPEG-2 TS may be considered to correspond to a specific PID value.

Available media file format standards include ISO base media file format (ISO/IEC 14496-12, which may be abbreviated ISOBMFF) and file format for NAL unit structured video (ISO/IEC 14496-15), which derives from the ISOBMFF.

Video codec includes an encoder that transforms the input video into a compressed representation suited for storage/transmission and a decoder that can decompress the compressed video representation back into a viewable form. A video encoder and/or a video decoder may also be separate from each other, for example, need not form a codec. Typically, encoder discards some information in the original video sequence in order to represent the video in a more compact form (e.g., at lower bitrate).

Typical hybrid video encoders, for example, many encoder implementations of ITU-T H.263 and H.264, encode the video information in two phases. Firstly pixel values in a certain picture area (or "block") are predicted, for example, by motion compensation means (finding and indicating an area in one of the previously coded video frames that corresponds closely to the block being coded) or by spatial means (using the pixel values around the block to be coded in a specified manner). Secondly the prediction error, for example, the difference between the predicted block of pixels and the original block of pixels, is coded. This is typically done by transforming the difference in pixel values using a specified transform (for example, Discrete Cosine Transform (DCT) or a variant of it), quantizing the coefficients and entropy coding the quantized coefficients. By varying the fidelity of the quantization process, encoder can control the balance between the accuracy of the pixel representation (picture quality) and size of the resulting coded video representation (file size or transmission bitrate).

In temporal prediction, the sources of prediction are previously decoded pictures (a.k.a. reference pictures). In intra block copy (IBC; a.k.a. intra-block-copy prediction and current picture referencing), prediction is applied similarly to temporal prediction but the reference picture is the current picture and only previously decoded samples can be referred in the prediction process. Inter-layer or inter-view prediction may be applied similarly to temporal prediction, but the reference picture is a decoded picture from another scalable layer or from another view, respectively. In some cases, inter prediction may refer to temporal prediction only, while in other cases inter prediction may refer collectively to temporal prediction and any of intra block copy, inter-layer prediction, and inter-view prediction provided that they are performed with the same or similar process than temporal prediction. Inter prediction or temporal prediction may sometimes be referred to as motion compensation or motion-compensated prediction.

Inter prediction, which may also be referred to as temporal prediction, motion compensation, or motion-compensated prediction, reduces temporal redundancy. In inter prediction the sources of prediction are previously decoded pictures. Intra prediction utilizes the fact that adjacent pixels within the same picture are likely to be correlated. Intra prediction can be performed in spatial or transform domain, for example, either sample values or transform coefficients can be predicted. Intra prediction is typically exploited in intra coding, where no inter prediction is applied.

One outcome of the coding procedure is a set of coding parameters, such as motion vectors and quantized transform coefficients. Many parameters can be entropy-coded more efficiently when they are predicted first from spatially or temporally neighboring parameters. For example, a motion vector may be predicted from spatially adjacent motion vectors and only the difference relative to the motion vector predictor may be coded. Prediction of coding parameters and intra prediction may be collectively referred to as in-picture prediction.

An intra-coded picture (also called I picture or I frame) is such that only includes intra-coded blocks. Intra-coded blocks may only utilize in-picture prediction and, in some coding specifications, intra block copy. The syntax of an I picture may exclude syntax elements that are related to inter prediction. An inter-coded picture is such where blocks can be intra- or inter-coded. Inter-coded pictures may further be categorized into P and B pictures (also called P and B frames, respectively), where P pictures are such that blocks may be intra-coded or inter-coded using only one motion vector per block (a.k.a. uni-prediction), and blocks in B pictures may be intra-coded or inter-coded with up to two motion vectors per block (a.k.a. bi-prediction).

Figure 4:
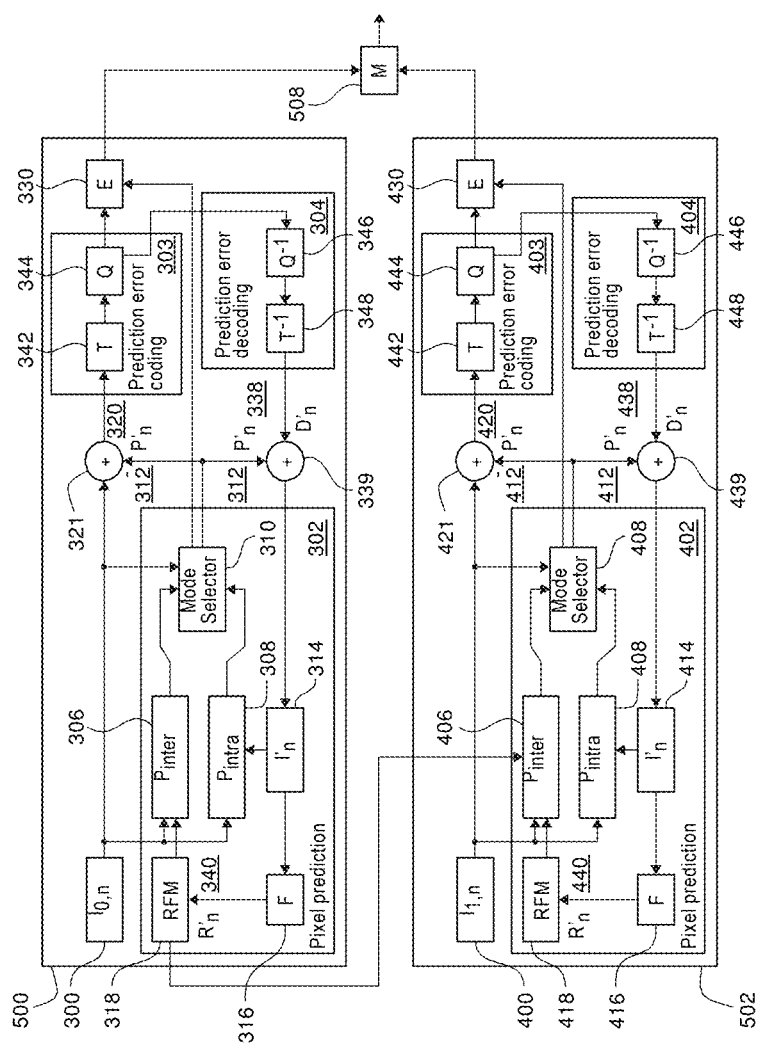
FIG. 4 shows schematically a block diagram of an encoder on a general level.

FIG. 4 shows a block diagram of a general structure of a video encoder. FIG. 4 presents an encoder for two layers, but it would be appreciated that presented encoder could be similarly extended to encode more than two layers. FIG. 4 illustrates a video encoder comprising a first encoder section 500 for a base layer and a second encoder section 502 for an enhancement layer. Each of the first encoder section 500 and the second encoder section 502 may comprise similar elements for encoding incoming pictures. The encoder sections 500, 502 may comprise a pixel predictor 302, 402, prediction error encoder 303, 403 and prediction error decoder 304, 404. FIG. 4 also shows an embodiment of the pixel predictor 302, 402 as comprising an inter-predictor 306, 406, an intra-predictor 308, 408, a mode selector 310, 410, a filter 316, 416, and a reference frame memory 318, 418. The pixel predictor 302 of the first encoder section 500 receives base layer image(s) 300 of a video stream to be encoded at both the inter-predictor 306 (which determines the difference between the image and a motion compensated reference frame) and the intra-predictor 308 (which determines a prediction for an image block based only on the already processed parts of current frame or picture). The output of both the inter-predictor and the intra-predictor are passed to the mode selector 310. The intra-predictor 308 may have more than one intra-prediction modes. Hence, each mode may perform the intra-prediction and provide the predicted signal to the mode selector 310. The mode selector 310 also receives a copy of the base layer image 300. Correspondingly, the pixel predictor 402 of the second encoder section 502 receives enhancement layer image(s) 400 of a video stream to be encoded at both the inter-predictor 406 (which determines the difference between the image and a motion compensated reference frame) and the intra-predictor 408 (which determines a prediction for an image block based only on the already processed parts of current frame or picture). The output of both the inter-predictor and the intra-predictor are passed to the mode selector 410. The intra-predictor 408 may have more than one intra-prediction modes. Hence, each mode may perform the intra-prediction and provide the predicted signal to the mode selector 410. The mode selector 410 also receives a copy of the enhancement layer picture 400.

Depending on which encoding mode is selected to encode the current block, the output of the inter-predictor 306, 406 or the output of one of the optional intra-predictor modes or the output of a surface encoder within the mode selector is passed to the output of the mode selector 310, 410. The output of the mode selector 310, 410 is passed to a first summing device 321, 421. The first summing device may subtract the output of the pixel predictor 302, 402 from the base layer image 300 or the enhancement layer image 400 to produce a first prediction error signal 320, 420 which is input to the prediction error encoder 303, 403.

The pixel predictor 302, 402 further receives from a preliminary reconstructor 339, 439 the combination of the prediction representation of the image block 312, 412 and the output 338, 438 of the prediction error decoder 304, 404. The preliminary reconstructed image 314, 414 may be passed to the intra-predictor 308, 408 and to a filter 316, 416. The filter 316, 416 receiving the preliminary representation may filter the preliminary representation and output a final reconstructed image 340, 440 which may be saved in a reference frame memory 318, 418. The reference frame memory 318 may be connected to the inter-predictor 306 to be used as the reference image against which a future base layer image 300 is compared in inter-prediction operations. Subject to the base layer being selected and indicated to be source for inter-layer sample prediction and/or inter-layer motion information prediction of the enhancement layer according to some embodiments, the reference frame memory 318 may also be connected to the inter-predictor 406 to be used as the reference image against which a future enhancement layer images 400 is compared in inter-prediction operations. Moreover, the reference frame memory 418 may be connected to the inter-predictor 406 to be used as the reference image against which a future enhancement layer image 400 is compared in inter-prediction operations.

Filtering parameters from the filter 316 of the first encoder section 500 may be provided to the second encoder section 502 subject to the base layer being selected and indicated to be source for predicting the filtering parameters of the enhancement layer according to some embodiments.

The prediction error encoder 303, 403 comprises a transform unit 342, 442 and a quantizer 344, 444. The transform unit 342, 442 transforms the first prediction error signal 320, 420 to a transform domain. The transform is, for example, the DCT transform. The quantizer 344, 444 quantizes the transform domain signal, for example, the DCT coefficients, to form quantized coefficients.

The prediction error decoder 304, 404 receives the output from the prediction error encoder 303, 403 and performs the opposite processes of the prediction error encoder 303, 403 to produce a decoded prediction error signal 338, 438 which, when combined with the prediction representation of the image block 312, 412 at the second summing device 339, 439, produces the preliminary reconstructed image 314, 414. The prediction error decoder may be considered to comprise a dequantizer 346, 446, which dequantizes the quantized coefficient values, for example, DCT coefficients, to reconstruct the transform signal and an inverse transformation unit 348, 448, which performs the inverse transformation to the reconstructed transform signal wherein the output of the inverse transformation unit 348, 448 includes reconstructed block(s). The prediction error decoder may also comprise a block filter which may filter the reconstructed block(s) according to further decoded information and filter parameters.

The entropy encoder 330, 430 receives the output of the prediction error encoder 303, 403 and may perform a suitable entropy encoding/variable length encoding on the signal to provide error detection and correction capability. The outputs of the entropy encoders 330, 430 may be inserted into a bitstream, for example, by a multiplexer 508.

Figure 5:
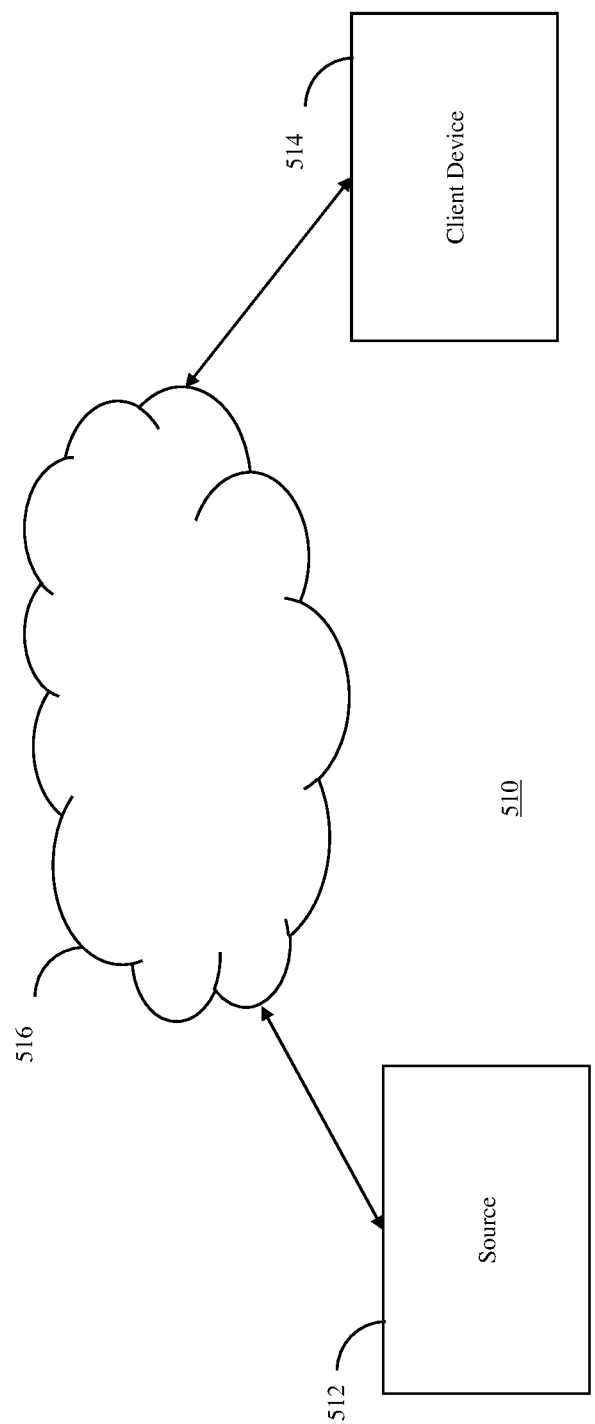
FIG. 5 illustrates a system configured to support streaming of media data from a source to a client device.

The method and apparatus of an example embodiment may be utilized in a wide variety of systems, including systems that rely upon the compression and decompression of media data and possibly also the associated metadata. In one embodiment, however, the method and apparatus are configured to compress the media data and associated metadata streamed from a source via a content delivery network to a client device, at which point the compressed media data and associated metadata is decompressed or otherwise processed. In this regard, FIG. 5 depicts an example of such a system 510 that includes a source 512 of media data and associated metadata. The source may be, in one embodiment, a server. However, the source may be embodied in other manners when desired. The source is configured to stream the media data and associated metadata to the client device 514. The client device may be embodied by a media player, a multimedia system, a video system, a smart phone, a mobile telephone or other user equipment, a personal computer, a tablet computer or any other computing device configured to receive and decompress the media data and process associated metadata. In the illustrated embodiment, media data and metadata are streamed via a network 516, such as any of a wide variety of types of wireless networks and/or wireline networks. The client device is configured to receive structured information including media, metadata and any other relevant representation of information including the media and the metadata and to decompress the media data and process the associated metadata (e.g. for proper playback timing of decompressed media data).

Figure 6:
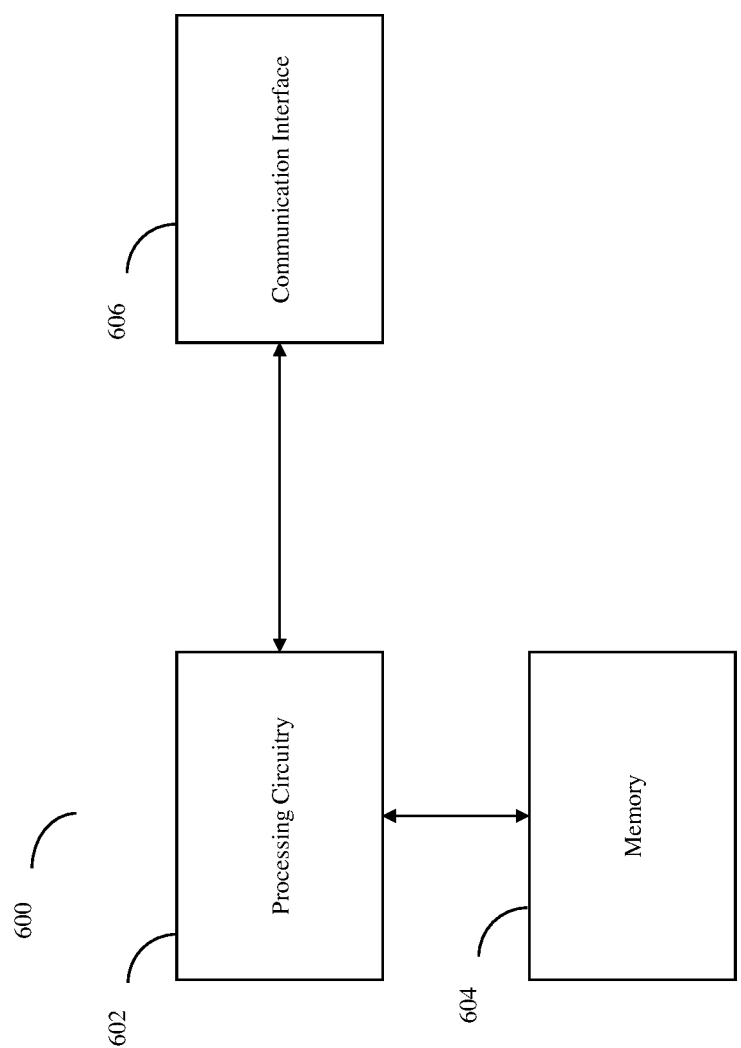
FIG. 6 is a block diagram of an apparatus that may be specifically configured in accordance with an example embodiment.

An apparatus 600 is provided in accordance with an example embodiment as shown in FIG. 6. In one embodiment, the apparatus of FIG. 6 may be embodied by the source 512, such as a file writer which, in turn, may be embodied by a server, that is configured to stream a compressed representation of the media data and associated metadata. In an alternative embodiment, the apparatus may be embodied by a client device 514, such as a file reader which may be embodied, for example, by any of the various computing devices described above. In either of these embodiments and as shown in FIG. 6, the apparatus of an example embodiment is associated with or is in communication with a processing circuitry 602, one or more memory devices 604, a communication interface 606, and optionally a user interface.

The processing circuitry 602 may be in communication with the memory device 604 via a bus for passing information among components of the apparatus 600. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processing circuitry). The memory device may be configured to store information, data, content, applications, instructions, or the like for enabling the apparatus to carry out various functions in accordance with an example embodiment of the present disclosure. For example, the memory device could be configured to buffer input data for processing by the processing circuitry. Additionally or alternatively, the memory device could be configured to store instructions for execution by the processing circuitry.

The apparatus 600 may, in some embodiments, be embodied in various computing devices as described above. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present disclosure on a single chip or as a single 'system on a chip'. As such, in some cases, a chip or chipset may constitute means for performing one or more operations for providing the functionalities described herein.

The processing circuitry 602 may be embodied in a number of different ways. For example, the processing circuitry may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry may include one or more processing cores configured to perform independently. A multi-core processing circuitry may enable multiprocessing within a single physical package. Additionally or alternatively, the processing circuitry may include one or more processors configured in tandem via the bus to enable independent execution of instructions, pipelining and/or multithreading.

In an example embodiment, the processing circuitry 602 may be configured to execute instructions stored in the memory device 604 or otherwise accessible to the processing circuitry. Alternatively or additionally, the processing circuitry may be configured to execute hard coded functionality. As such, whether configured by hardware or software methods, or by a combination thereof, the processing circuitry may represent an entity (e.g., physically embodied in circuitry) capable of performing operations according to an embodiment of the present disclosure while configured accordingly. Thus, for example, when the processing circuitry is embodied as an ASIC, FPGA or the like, the processing circuitry may be specifically configured hardware for conducting the operations described herein. Alternatively, as another example, when the processing circuitry is embodied as an executor of instructions, the instructions may specifically configure the processing circuitry to perform the algorithms and/or operations described herein when the instructions are executed. However, in some cases, the processing circuitry may be a processor of a specific device (e.g., an image or video processing system) configured to employ an embodiment of the present invention by further configuration of the processing circuitry by instructions for performing the algorithms and/or operations described herein. The processing circuitry may include, among other things, a clock, an arithmetic logic unit (ALU) and logic gates configured to support operation of the processing circuitry.

The communication interface 606 may be any means such as a device or circuitry embodied in either hardware or a combination of hardware and software that is configured to receive and/or transmit data, including video bitstreams. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In some embodiments, the apparatus 600 may optionally include a user interface that may, in turn, be in communication with the processing circuitry 602 to provide output to a user, such as by outputting an encoded video bitstream and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processing circuitry may comprise user interface circuitry configured to control at least some functions of one or more user interface elements such as a display and, in some embodiments, a speaker, ringer, microphone and/or the like. The processing circuitry and/or user interface circuitry comprising the processing circuitry may be configured to control one or more functions of one or more user interface elements through computer program instructions (e.g., software and/or firmware) stored on a memory accessible to the processing circuitry (e.g., memory device, and/or the like).

ISO Base Media File Format

Available media file format standards include International Standards Organization (ISO) base media file format (ISO/IEC 14496-12, which may be abbreviated ISOBMFF), Moving Picture Experts Group (MPEG)-4 file format (ISO/IEC 14496-14, also known as the MP4 format), and file format for NAL (Network Abstraction Layer) unit structured video (ISO/IEC 14496-15). ISO/IEC 14496-15 specifies ISOBMFF-compliant storage of NAL unit structured video bitstreams, such as Advanced Video Coding (AVC or H.264/AVC), High Efficiency Video Coding (HEVC or H.265/HEVC), and Versatile Video Coding (VVC or H.266/VVC) bitstreams.

Some concepts, structures, and specifications of ISOBMFF are described below as an example of a container file format, based on which some embodiments may be implemented. The features of the disclosure are not limited to ISOBMFF, but rather the description is given for one possible basis on top of which at least some embodiments may be partly or fully realized.

A basic building block in the ISO base media file format is called a box. Each box has a header and a payload. The box header indicates the type of the box and the size of the box in terms of bytes. Box type is typically identified by an unsigned 32-bit integer, interpreted as a four character code (4CC or 4cc). A box may enclose other boxes, and the ISO file format specifies which box types are allowed within a box of a certain type. Furthermore, the presence of some boxes may be mandatory in each file, while the presence of other boxes may be optional. Additionally, for some box types, it may be allowable to have more than one box present in a file. Thus, the ISO base media file format may be considered to specify a hierarchical structure of boxes.

In files conforming to the ISO base media file format, the media data may be provided in one or more instances of MediaDataBox (mdat) and the MovieBox ('moov') may be used to enclose the metadata for timed media. In some examples, for a file to be operable, both of the 'mdat' and 'moov' boxes may be required to be present. The 'moov' box may include one or more tracks, and each track may reside in one corresponding TrackBox ('trak'). Each track is associated with a handler, identified by a four-character code, specifying the track type. Video, audio, and image sequence tracks may be collectively called media tracks, and they include an elementary media stream. Other track types include hint tracks and timed metadata tracks.

Tracks include samples, such as audio or video frames. For video tracks, a media sample may correspond to a coded picture or an access unit.

A media track refers to samples (which may also be referred to as media samples) formatted according to a media compression format (and its encapsulation to the ISO base media file format). A hint track refers to hint samples, including cookbook instructions for constructing packets for transmission over an indicated communication protocol. A timed metadata track may refer to samples describing referred media and/or hint samples.

The 'trak' box includes in its hierarchy of boxes the SampleDescriptionBox, which gives detailed information about the coding type used, and any initialization information needed for that coding. The SampleDescriptionBox contains an entry-count and as many sample entries as the entry-count indicates. The format of sample entries is track-type specific but derived from generic classes (e.g., VisualSampleEntry, AudioSampleEntry). Which type of sample entry form is used for derivation of the track-type specific sample entry format is determined by the media handler of the track.

The track reference mechanism may be used to associate tracks with each other. The TrackReferenceBox includes box(es), each of which provides a reference from the containing track to a set of other tracks. These references are labeled through the box type (e.g., the four-character code of the box) of the contained box(es).

The ISO Base Media File Format includes three mechanisms for timed metadata that may be associated with particular samples: sample groups, timed metadata tracks, and sample auxiliary information. A derived specification may provide similar functionality with one or more of these three mechanisms.

A sample grouping in the ISO base media file format and its derivatives, such as the advanced video coding (AVC) file format and the scalable video coding (SVC) file format, may be defined as an assignment of each sample in a track to be a member of one sample group, based on a grouping criterion. A sample group in a sample grouping is not limited to being contiguous samples and may contain non-adjacent samples. As there may be more than one sample grouping for the samples in a track, each sample grouping may have a type field to indicate the type of grouping. Sample groupings may be represented by two linked data structures: (1) a SampleToGroupBox (sbgp box) represents the assignment of samples to sample groups; and (2) a SampleGroupDescriptionBox (sgpd box) includes a sample group entry for each sample group describing the properties of the group. There may be multiple instances of the SampleToGroupBox and SampleGroupDescriptionBox based on different grouping criteria. These may be distinguished by a type field used to indicate the type of grouping. SampleToGroupBox may include a grouping_type_parameter field that may be used, e.g., to indicate a sub-type of the grouping.

In ISOMBFF, an edit list provides a mapping between the presentation timeline and the media timeline. Among other things, an edit list provides for the linear offset of the presentation of samples in a track, provides for the indication of empty times and provides for a particular sample to be dwelled on for a certain period of time. The presentation timeline may be accordingly modified to provide for looping, such as for the looping videos of the various regions of the scene. One example of the box that includes the edit list, the EditListBox, is provided below:

```
aligned(8) class EditListBox extends FullBox('elst', version, flags) {
unsigned int(32) entry_count;
for (i=1; i <= entry_count; i++) {
if (version==1) {
unsigned int(64) segment_duration;
int(64) media_time;
} else { // version==0)
unsigned int(32) segment_duration;
int(32) media_time;
}
int(16) media_rate_integer;
int(16) media_rate_fraction = 0;
}
}
```

In ISOBMFF, an EditListBox may be contained in EditBox, which is contained in TrackBox ('trak').

In this example of the edit list box, flags specify the repetition of the edit list. By way of example, setting a specific bit within the box flags (the least significant bit, e.g., flags & 1 in ANSI-C notation, where & indicates a bit-wise AND operation) equal to 0 specifies that the edit list is not repeated, while setting the specific bit (e.g., flags & 1 in ANSI-C notation) equal to 1 specifies that the edit list is repeated. The values of box flags greater than 1 may be defined to be reserved for future extensions. As such, when the edit list box indicates the playback of zero or one samples, (flags & 1) shall be equal to zero. When the edit list is repeated, the media at time 0 resulting from the edit list follows immediately the media having the largest time resulting from the edit list such that the edit list is repeated seamlessly.

In ISOBMFF, a Track group enables grouping of tracks based on certain characteristics or the tracks within a group have a particular relationship. Track grouping, however, does not allow any image items in the group.

The syntax of TrackGroupBox in ISOBMFF is as follows:

```
aligned(8) class TrackGroupBox extends Box('trgr') {
}
aligned(8) class TrackGroupTypeBox(unsigned int(32) track_group_type)
extends
FullBox(track_group_type, version = 0, flags = 0)
{
    unsigned int(32) track_group_id;
    // the remaining data may be specified for a particular
    track_group_type
}
``` track_group_type indicates the grouping_type and may be set to one of the following values, or a value registered, or a value from a derived specification or registration:

'msrc' indicates that this track belongs to a multi-source presentation. The tracks that have the same value of track_group_id within a TrackGroupTypeBox of track_group_type 'msrc' are mapped as being originated from the same source. For example, a recording of a video telephony call may have both audio and video for both participants, and the value of track_group_id associated with the audio track and the video track of one participant differs from value of track_group_id associated with the tracks of the other participant.

The pair of track_group_id and track_group_type identifies a track group within the file. The tracks that contain a particular TrackGroupTypeBox having the same value of track_group_id and track_group_type belong to the same track group.

The Entity grouping is similar to track grouping but enables grouping of both tracks and image items in the same group.

The syntax of EntityToGroupBox in ISOBMFF is as follows:

```
aligned(8) class EntityToGroupBox(grouping_type, version, flags)
    extends FullBox(grouping_type, version, flags) {
    unsigned int(32) group_id;
    unsigned int(32) num_entities_in_group;
    for(i=0; i<num_entities_in_group; i++)
        unsigned int(32) entity_id;
}
``` group_id is a non-negative integer assigned to the particular grouping that shall not be equal to any group_id value of any other EntityToGroupBox, any item_ID value of the hierarchy level (a file, a movie, or a track) that includes the GroupsListBox, or any track_ID value (when the GroupsListBox is included in the file level).

num_entities_in_group specifies the number of entity_id values mapped to this entity group.

entity_id is resolved to an item, when an item with item_ID equal to entity_id is present in the hierarchy level (file, movie or track) that contains the GroupsListBox, or to a track, when a track with track_ID equal to entity_id is present and the GroupsListBox is contained in the file level.

Files conforming to the ISOBMFF may contain any non-timed objects, referred to as items, meta items, or metadata items, in a meta box (four-character code: 'meta'). While the name of the meta box refers to metadata, items can generally contain metadata or media data. The meta box may reside at the top level of the file, within a movie box (four-character code: 'moov'), and within a track box (four-character code: 'trak'), but at most one meta box may occur at each of the file level, movie level, or track level. The meta box may be required to contain a 'hdlr' box indicating the structure or format of the 'meta' box contents. The meta box may list and characterize any number of items that can be referred and each one of them can be associated with a file name and are uniquely identified with the file by item identifier (item_id) which is an integer value. The metadata items may be for example stored in the 'idat' box of the meta box or in an 'mdat' box or reside in a separate file. When the metadata is located external to the file, its location may be declared by the DataInformationBox (four-character code: 'dinf'). In the specific case that the metadata is formatted using eXtensible Markup Language (XML) syntax and is required to be stored directly in the MetaBox, the metadata may be encapsulated into either the XMLBox (four-character code: 'xml') or the BinaryXMLBox (four-character code: 'bxml'). An item may be stored as a contiguous byte range, or it may be stored in several extents, each being a contiguous byte range. In other words, items may be stored fragmented into extents, e.g., to enable interleaving. An extent is a contiguous subset of the bytes of the resource. The resource can be formed by concatenating the extents.

The ItemPropertiesBox enables the association of any item with an ordered set of item properties. Item properties may be regarded as small data records. The ItemPropertiesBox consists of two parts: ItemPropertyContainerBox that contains an implicitly indexed list of item properties, and one or more ItemPropertyAssociationBox(es) that associate items with item properties.

High Efficiency Image File Format (HEIF)

High Efficiency Image File Format (HEIF, ISO/IEC 23008-12) is a standard developed by the Moving Picture Experts Group (MPEG) for storage of images and image sequences. Among other things, the standard facilitates file encapsulation of data coded according to the Advanced Video Coding (AVC) standard, the High Efficiency Video Coding (HEVC) standard, or the Versatile Video Coding (VVC) standard. HEIF includes features building on top of the used ISO Base Media File Format (ISOBMFF).

The ISOBMFF structures and features are used to a large extent in the design of HEIF. The basic design for HEIF comprises still images that are stored as items and image sequences that are stored as tracks.

In the context of HEIF, the following boxes may be included within the root-level 'meta' box and may be used as described in the following. In HEIF, the handler value of the Handler box of the 'meta' box is 'pict'. The resource (whether within the same file, or in an external file identified by a uniform resource identifier) including the coded media data is resolved through the data information ('dinf') box, whereas the item location ('iloc') box stores the position and sizes of every item within the referenced file. The item reference ('iref') box documents relationships between items using typed referencing. When there is an item among a collection of items that is in some way to be considered the most important compared to others then this item is signaled by the primary item ('pitm') box. Apart from the boxes mentioned here, the 'meta' box is also flexible to include other boxes that may be necessary to describe items.

Any number of image items can be included in the same file. Given a collection of images stored by using the 'meta' box approach, it sometimes is essential to qualify certain relationships between images. Examples of such relationships include indicating a cover image for a collection, providing thumbnail images for some or all of the images in the collection, and associating some or all of the images in a collection with an auxiliary image such as an alpha plane. A cover image among the collection of images is indicated using the 'pitm' box. A thumbnail image or an auxiliary image is linked to the primary image item using an item reference of type 'thmb' or 'auxl', respectively.

A derived image item may be defined as an image item whose data includes a derived image, where a derived image is a representation of an image as an operation on one or more other images. An operation for a derived image item is a manipulation, identified by the item type, that produces a reconstructed image from a set of one or more input images. An item is a derived image item, when it includes a 'dimg' item reference to one or more other image items, which are inputs to the derivation. The image items used as input to a derived image item are output images of other image items, which may be coded image items or derived image items.

An item with an item_type value of 'iovl' (a.k.a. overlay derived image item) defines a derived image item by overlaying one or more input images in a given layering order and given spatial positions within a canvas. The input images are listed in the order they are layered, e.g., the bottom-most input image first and the top-most input image last, in the SingleItemTypeReferenceBox of type 'dimg' for this derived image item within the ItemReferenceBox.

An item with an item_type value of 'grid' (a.k.a. grid derived image item) defines a derived image item whose reconstructed image is formed from one or more input images in a given grid order within a canvas. The input images are inserted in row-major order, top-row first, left to right, in the order of SingleItemTypeReferenceBox of type 'dimg' for this derived image item within the ItemReferenceBox. In the SingleItemTypeReferenceBox of type 'dimg', the value of from_item_ID identifies the derived image item of type 'grid', the value of reference_count is equal to rows*columns (* being a multiplication sign), and the values of to_item_ID identify the input images. All input images have the same width and height; call those tile_width and tile_height. The tiled input images completely "cover" the reconstructed image grid canvas, where tile_width*columns is greater than or equal to output_width and tile_height*rows is greater than or equal to output_height. The reconstructed image is formed by tiling the input images into a grid with a column width (potentially excluding the right-most column) equal to tile_width and a row height (potentially excluding the bottom-most row) equal to tile_height, without gap or overlap, and then trimming on the right and the bottom to the indicated output_width and output_height.

Predictively coded image items have a decoding dependency to one or more other coded image items. An example for such an image item could be a P frame stored as an image item in a burst entity group that has IPPP . . . structure, with the P frames dependent only on the preceding I frame.

Capability to have predictively coded image items has certain benefits especially in content re-editing and cover image selection, for example:

Image sequences may be converted to image items with no transcoding;

Any sample of an image sequence track may be selected as a cover image. The cover image does not need to be intra-coded;

Devices that do not have a video or image encoder are capable of updating the cover image of a file including an image sequence track;

Storage efficiency is further achieved by re-using the predictively coded picture rather than re-encoding it as I frame and storing as an additional image item. Moreover, image quality degradation is also avoided; and/or Re-encoding might not be allowed or preferred by the copyright owner. Predictively coded image items avoid the need of re-encoding of any image from an image sequence track.

Predictively coded image items are linked to the coded image items they directly and indirectly depend on by item references of type 'pred'. The list of referenced items in item references of type 'pred' shall indicate the decoding order. When concatenated, the encoded media data of items with item_ID equal to to_item_ID for all values of j from 0 to reference_count−1, inclusive, in increasing order of j, followed by the item with item_ID equal to from_item_ID shall form a bitstream that conforms to the decoder configuration item property of the predictively coded image item.

In order to decode the predictively coded image item, there shall be no other decoding dependencies other than the image items referenced by item references of type 'pred'.

The predictively coded image item may be required to be associated with exactly one RequiredReferenceTypesProperty containing one reference type with the value 'pred'.

A file having the 'pred' brand in the compatible_brands of a TypeCombinationBox associated with the FileTypeBox may contain predictively coded image items and may conform to following:

When 'mif1' brand is among the compatible brands array of the FileTypeBox then the primary item may be independently coded. Additionally, an alternate group including this primary item and possibly predictively coded image items may exist.

When the 'pred' brand is in the compatible_brands of a TypeCombinationBox associated with the FileTypeBox, and the 'mif1' brand is not among the compatible brands array of the FileTypeBox, then the primary item and possibly all items from the alternate group containing the primary item can be predictively coded image items For each predictively coded image item present in the file, the file may also include all items that the predictively coded image item depends on (by item references of type 'pred').

The RequiredReferenceTypesProperty descriptive item property lists the item reference types that a reader may understand and process to decode the associated image item. The respective essential flag may be equal to 1 in ItemPropertyAssociationBox.

In the absence of this property, required reference types are not explicitly listed, but can still exist.

Syntax

```
aligned(8) class RequiredReferenceTypesProperty
extends ItemFullProperty('rref', version = 0, flags = 0){
    unsigned int(8) reference_type_count;
    for (i=0; i< reference_type_count; i++) {
        unsigned int(32) reference_type[i];
    }
}
```

Semantics reference_type_count indicates the number of reference types that are required to understand and process to decode the associated image item.

reference_type[i] indicates a reference type that is required to understand and process to decode the associated image item.

A VVC subpicture item forms a subset of an VVC access unit, wherein for each layer present in the bitstream, there is one or more 'extractable' VVC subpictures that collectively form a rectangular region, where an 'extractable' VVC subpicture refers to a subpicture for which the corresponding flag sps_subpic_treated_as_pic_flag[i] is equal to 1.

When the VVC subpicture item is suitable to be decoded with a VVC decoder and to be consumed without other VVC subpicture items, the VVC subpicture item may be stored as an item of type 'vvc1'. Otherwise, the VVC subpicture item may be stored as an item of type 'vvs1' and formatted as a series of NAL units preceded by length fields.

A 'vvc1' image item that is referenced by a VVC base item with a 'subp' item reference is a VVC subpicture item.

A VVC base item is a 'vvc1' image item that includes a 'subp' item reference.

An entry of a 'subp' item reference may be an item_ID value of a VVC subpicture item or a group_id value of an alternative extraction source entity group ('alte') of VVC subpicture items. The item data of the VVC base item does not include VCL NAL units. The VVC base item may be associated with an item property VvcSubpicOrderProperty.

A VVC bitstream may be reconstructed from a VVC base item, wherein the reconstruction includes the item data of the referenced VVC subpicture items as determined by the VvcSubpicOrderProperty.

Progressive Rendering

Progressive rendering (a.k.a. progressive refinement and progressive decoding) refers to displaying the image content of a file in successive steps, where each step improves the perceived image quality over that of the previous step and replaces partly or entirely the image content of the previous step in the same displaying window. Progressive rendering may be performed while downloading the file to display image content before the entire file has been downloaded. This is sometimes referred to as progressive download and may be advantageous when the download rate is relatively low compared to the file size. For progressive download, the coded image or video data in the file may be ordered in its decoding order. Alternatively or additionally, progressive rendering may be performed when decoding of a highest quality image takes a relatively long time, e.g., due to its large spatial resolution.

Progressive Derived Image Item Information Property

The progressive derived image item information property describes progressive rendering steps associated with a derived image item.

Each progressive rendering step specifies which input image items to use for the reconstruction of the derived image item and is described as a difference from the previous step.

The ProgressiveDerivedImageItemInformationProperty is intended to be used with derived image items using several input images.

Syntax

```
aligned(8) class ProgressiveDerivedImageItemInformationProperty
    extends ItemFullProperty('prdi', version = 0, flags = 0){
```

-continued

```
    unsigned int(16) step_count;
    for (i=0; i < step_count; i++)
        unsigned int(16) item_count;
}
```

Semantics step_count is the number of progressive steps for the associated derived image item.

item_count is the number of input image items added by the progressive step.

Progressive Rendering Entity Group

In certain constrained environments such as narrow bandwidth, limited field-of-view viewing displays, retrieving/downloading an original image of high quality and resolution may be time consuming and unnecessary. Many a times a user may be interested in viewing a lower quality and/or resolution of an image and perhaps some high-resolution details, in such scenarios it may be inefficient to retrieve/download the whole image of high quality and resolution. This problem may be overcome by having multiple representations of an image with different quality and/or resolutions and the reader/player to retrieve/download the different representation in a progressive way also known as progressive rendering of images. Furthermore, each image representation may be divided into multiple spatial regions and the reader/player to retrieve/download the spatial regions from different representation in a progressive way based on the viewing conditions.

A high efficiency image file format (HEIF) working draft of amendment MDS_21323_WG_03_N0507 provides a solution for progressive rendering of images in the HEIF image file format. It specifies the following.

A progressive rendering entity group ('prgr') includes image items listed in increasing quality order from a lowest quality to a highest quality. The image items inside a 'prgr' entity group correspond to similar images with different quality levels. In this way, a first image item occurring earlier in the list than a second image item may be used as a temporary replacement of a second image item for a progressive rendering of this second image item. The data corresponding to the image items included in the 'prgr' entity group may be stored in the same order as the one used for the image items inside the 'prgr' entity group, such that a renderer progressively obtaining a file may perform a progressive display as item data becomes available.

The progressive derived image item information property describes progressive rendering steps associated with a derived image item. Each progressive rendering step specifies which input image items to use for the reconstruction of the derived image item and is described as a difference from the previous step.

The progressive rendering entity group (with a grouping_type 'prgr') signals a set of image items that can be used for a progressive rendering of one of these image items.

A 'prgr' entity group includes image items, not tracks.

Image items of the same 'prgr' entity group may be members of the same 'altr' entity group. This guarantees that legacy players without capability of processing 'prgr' entity groups treat the image items as alternatives to be displayed. The items and tracks mapped to an 'altr' entity group are alternatives to each other, and only one of them should be played (when the mapped items and tracks are part of the presentation; e.g., are displayable items or tracks) or processed by other means (when the mapped items or tracks are not part of the presentation; e.g., are metadata). A player may select the first entity from the list of entity_id values that it may process (e.g., decode and play for mapped items and tracks that are part of the presentation) and that suits the application needs. An alternate group of entities includes those items and tracks that are mapped to the same entity group of type 'altr'.

However, it may not be known at the time of creating a file whether progressive rendering is the target usage or if the file is alternatively or additionally used for other purposes too. A single copy of coded video data should be stored in a file for progressive rendering and other use cases. For example, for a local file playback, progressive rendering is unnecessary since the highest quality/resolution image could be decoded and displayed without progressive steps.

An embodiment provides, for example, a flexibility to a reader or a player to choose between downloading of the whole image in highest quality or resolution versus performing a progressive rendering of the image.

The H.264/AVC standard was developed by the Joint Video Team (JVT) of the Video Coding Experts Group (VCEG) of the Telecommunications Standardization Sector of International Telecommunication Union (ITU-T) and the Moving Picture Experts Group (MPEG) of International Organisation for Standardization (ISO)/International Electrotechnical Commission (IEC). The H.264/AVC standard is published by both parent standardization organizations, and it is referred to as ITU-T Recommendation H.264 and ISO/IEC International Standard 14496-10, also known as MPEG-4 Part 10 Advanced Video Coding (AVC). There have been multiple versions of the H.264/AVC standard, integrating new extensions or features to the specification. These extensions include Scalable Video Coding (SVC) and Multiview Video Coding (MVC).

Version 1 of the High Efficiency Video Coding (H.265/HEVC a.k.a. HEVC) standard was developed by the Joint Collaborative Team-Video Coding (JCT-VC) of VCEG and MPEG. The standard was published by both parent standardization organizations, and it is referred to as ITU-T Recommendation H.265 and ISO/IEC International Standard 23008-2, also known as MPEG-H Part 2 High Efficiency Video Coding (HEVC). Later versions of H.265/HEVC included scalable, multiview, fidelity range extensions, three-dimensional, and screen content coding extensions which may be abbreviated SHVC, MV-HEVC, REXT, 3D-HEVC, and SCC, respectively.

SHVC, MV-HEVC, and 3D-HEVC use a common basis specification, specified in Annex F of the version 2 of the HEVC standard. This common basis comprises for example high-level syntax and semantics, e.g., specifying some of the characteristics of the layers of the bitstream, such as inter-layer dependencies, as well as decoding processes, such as reference picture list construction including inter-layer reference pictures and picture order count derivation for multi-layer bitstream. Annex F may also be used in potential subsequent multi-layer extensions of HEVC. It is to be understood that even though a video encoder, a video decoder, encoding methods, decoding methods, bitstream structures, and/or embodiments may be described in the following with reference to specific extensions, such as SHVC and/or MV-HEVC, they are generally applicable to any multi-layer extensions of HEVC, and even more generally to any multi-layer video coding scheme.

The Versatile Video Coding standard (which may be abbreviated VVC, H.266, or H.266/VVC) was developed by the Joint Video Experts Team (JVET), which is a collaboration between the ISO/IEC MPEG and ITU-T VCEG. Extensions to VVC are presently under development.

Some key definitions, bitstream and coding structures, and concepts of H.264/AVC and HEVC are described in this section as an example of a video encoder, decoder, encoding method, decoding method, and a bitstream structure, wherein one or more embodiments may be implemented. Some of the key definitions, bitstream and coding structures, and concepts of H.264/AVC are the same as in HEVC—hence, they are described below jointly. However, embodiment of the invention are not limited to H.264/AVC or HEVC, but rather the description is given for one possible basis on top of which various embodiments of the invention may be partly or fully realized. Many embodiments described below in the context of H.264/AVC or HEVC may apply to VVC, and the aspects of the invention may hence be applied to VVC.

Similarly to many earlier video coding standards, the bitstream syntax and semantics as well as the decoding process for error-free bitstreams are specified in H.264/AVC and HEVC. The encoding process is not specified, but encoders must generate conforming bitstreams Bitstream and decoder conformance may be verified with a hypothetical reference decoder (HRD). The standards include coding tools that help in coping with transmission errors and losses, but the use of the tools in encoding is optional and no decoding process has been specified for erroneous bitstreams.

The elementary unit for the input to an H.264/AVC or HEVC encoder and the output of an H.264/AVC or HEVC decoder, respectively, is a picture. A picture given as an input to an encoder may also be referred to as a source picture, and a picture decoded by a decoded may be referred to as a decoded picture.

The source and decoded pictures are each comprised of one or more sample arrays, such as one of the following sets of sample arrays:

Luma (Y) only (monochrome);
Luma and two chroma (YCbCr or YCgCo);
Green, Blue and Red (GBR, also known as RGB); and/or
Arrays representing other unspecified monochrome or tri-stimulus color samplings (for example, YZX, also known as XYZ).

In the following, these arrays may be referred to as luma (or L or Y) and chroma, where the two chroma arrays may be referred to as Cb and Cr; regardless of the actual color representation method in use. The actual color representation method in use may be indicated, e.g., in a coded bitstream, e.g., by using the video usability information (VUI) syntax of H.264/AVC and/or HEVC. A component may be defined as an array or single sample from one of the three sample arrays (luma and two chroma) or the array or a single sample of the array that compose a picture in monochrome format.

In H.264/AVC and HEVC, a picture may either be a frame or a field. A frame comprises a matrix of luma samples and possibly the corresponding chroma samples. A field is a set of alternate sample rows of a frame and may be used as encoder input, when the source signal is interlaced. Chroma sample arrays may be absent (and hence monochrome sampling may be in use) or chroma sample arrays may be subsampled when compared to luma sample arrays. Chroma formats may be summarized as follows:

In monochrome sampling there is only one sample array, which may be nominally considered the luma array.
In 4:2:0 sampling, each of the two chroma arrays has half the height and half the width of the luma array.
In 4:2:2 sampling, each of the two chroma arrays has the same height and half the width of the luma array.

In 4:4:4 sampling when no separate color planes are in use, each of the two chroma arrays has the same height and width as the luma array.

In H.264/AVC and HEVC, it is possible to code sample arrays as separate color planes into the bitstream and respectively decode separately coded color planes from the bitstream. When separate color planes are in use, each one of them is separately processed (by the encoder and/or the decoder) as a picture with monochrome sampling.

A partitioning may be defined as a division of a set into subsets such that each element of the set is in exactly one of the subsets.

When describing the operation of HEVC encoding and/or decoding, the following terms may be used. A coding block may be defined as an N×N block of samples for some value of N such that the division of a coding tree block into coding blocks is a partitioning. A coding tree block (CTB) may be defined as an N×N block of samples for some value of N such that the division of a component into coding tree blocks is a partitioning. A coding tree unit (CTU) may be defined as a coding tree block of luma samples, two corresponding coding tree blocks of chroma samples of a picture that has three sample arrays, or a coding tree block of samples of a monochrome picture or a picture that is coded using three separate color planes and syntax structures used to code the samples. A coding unit (CU) may be defined as a coding block of luma samples, two corresponding coding blocks of chroma samples of a picture that has three sample arrays, or a coding block of samples of a monochrome picture or a picture that is coded using three separate color planes and syntax structures used to code the samples. A CU with the maximum allowed size may be named as LCU (largest coding unit) or coding tree unit (CTU) and the video picture is divided into non-overlapping LCUs.

A CU includes of one or more prediction units (PU) defining the prediction process for the samples within the CU and one or more transform units (TU) defining the prediction error coding process for the samples in the said CU. Typically, a CU consists of a square block of samples with a size selectable from a predefined set of possible CU sizes. Each PU and TU can be further split into smaller PUs and TUs in order to increase granularity of the prediction and prediction error coding processes, respectively. Each PU has prediction information associated with it defining what kind of a prediction is to be applied for the pixels within that PU (e.g., motion vector information for inter predicted PUs and intra prediction directionality information for intra predicted PUs).

Each TU can be associated with information describing the prediction error decoding process for the samples within the said TU (including e.g., DCT coefficient information). Whether prediction error coding is applied or not for each CU is typically signalled at CU level. In the case there is no prediction error residual associated with the CU, it may be considered there are no TUs for the said CU. The division of the image into CUs, and division of CUs into PUs and TUs is typically signalled in the bitstream allowing the decoder to reproduce the intended structure of these units.

In HEVC, a picture may be partitioned in tiles, which are rectangular and include an integer number of LCUs. In HEVC, the partitioning to tiles forms a regular grid, where heights and widths of tiles differ from each other by one LCU at the maximum. In HEVC, a slice is defined to be an integer number of coding tree units included in one independent slice segment and all subsequent dependent slice segments (when present) that precede the next independent slice segment (when present) within the same access unit. In HEVC, a slice segment is defined to be an integer number of coding tree units ordered consecutively in the tile scan and included in a single NAL unit. The division of each picture into slice segments is a partitioning. In HEVC, an independent slice segment is defined to be a slice segment for which the values of the syntax elements of the slice segment header are not inferred from the values for a preceding slice segment, and a dependent slice segment is defined to be a slice segment for which the values of some syntax elements of the slice segment header are inferred from the values for the preceding independent slice segment in decoding order. In HEVC, a slice header is defined to be the slice segment header of the independent slice segment that is a current slice segment or is the independent slice segment that precedes a current dependent slice segment, and a slice segment header is defined to be a part of a coded slice segment including the data elements pertaining to the first or all coding tree units represented in the slice segment. The CUs are scanned in the raster scan order of LCUs within tiles or within a picture, when tiles are not in use. Within an LCU, the CUs have a specific scan order.

In the following paragraphs, partitioning a picture into subpictures, slices, and tiles according to H.266/VVC is described more in detail. Similar concepts may apply in other video coding specifications too.

For partitioning a picture or image may be divided into one or more tile rows and one or more tile columns. A tile is a sequence of coding tree units (CTU) that covers a rectangular region of a picture. The CTUs in a tile are scanned in raster scan order within that tile.

A slice includes an integer number of complete tiles or an integer number of consecutive complete CTU rows within a tile of a picture. Consequently, each vertical slice boundary is also a vertical tile boundary. It is possible that a horizontal boundary of a slice is not a tile boundary but includes horizontal CTU boundaries within a tile; this occurs when a tile is split into multiple rectangular slices, each of which includes an integer number of consecutive complete CTU rows within the tile.

Generally two modes of slices are supported, for example, raster-scan slice mode and the rectangular slice mode. In the raster-scan slice mode, a slice includes a sequence of complete tiles in a tile raster scan of a picture. In the rectangular slice mode, a slice includes either a number of complete tiles that collectively form a rectangular region of the picture or a number of consecutive complete CTU rows of one tile that collectively form a rectangular region of the picture. Tiles within a rectangular slice are scanned in tile raster scan order within the rectangular region corresponding to that slice.

A subpicture may be defined as a rectangular region of one or more slices within a picture, wherein the one or more slices are complete. Thus, a subpicture includes one or more slices that collectively cover a rectangular region of a picture. Consequently, each subpicture boundary is also a slice boundary, and each vertical subpicture boundary is also a vertical tile boundary. The slices of a subpicture may be required to be rectangular slices.

One or both of the following conditions may be required to be fulfilled for each subpicture and tile: i) All CTUs in a subpicture belong to the same tile. ii) All CTUs in a tile belong to the same subpicture.

An independent VVC subpicture is treated like a picture in the VVC decoding process. Moreover, it may additionally be required that loop filtering across the boundaries of an independent VVC subpicture is disabled. Boundaries of a subpicture are treated like picture boundaries in the VVC decoding process when sps_subpic_treated_as_pic_flag[i] is equal to 1 for the subpicture. Loop filtering across the boundaries of a subpicture is disabled in the VVC decoding process when sps_loop_filter_across_subpic_enabled_pic_flag[i] is equal to 0.

An intra-coded slice (also called I slice) is such that only includes intra-coded blocks. The syntax of an I slice may exclude syntax elements that are related to inter prediction. An inter-coded slice is such where blocks can be intra- or inter-coded. Inter-coded slices may further be categorized into P and B slices, where P slices are such that blocks may be intra-coded or inter-coded but only using uni-prediction, and blocks in B slices may be intra-coded or inter-coded with uni- or bi-prediction.

A motion-constrained tile set (MCTS) is such that the inter prediction process is constrained in encoding such that no sample value outside the motion-constrained tile set, and no sample value at a fractional sample position that is derived using one or more sample values outside the motion-constrained tile set, is used for inter prediction of any sample within the motion-constrained tile set. Additionally, the encoding of an MCTS is constrained in a manner that motion vector candidates are not derived from blocks outside the MCTS. This may be enforced by turning off temporal motion vector prediction of HEVC, or by disallowing the encoder to use the TMVP candidate or any motion vector prediction candidate following the TMVP candidate in the merge or AMVP candidate list for PUs located directly left of the right tile boundary of the MCTS except the last one at the bottom right of the MCTS. In general, an MCTS may be defined to be a tile set that is independent of any sample values and coded data, such as motion vectors, that are outside the MCTS. In some cases, an MCTS may be required to form a rectangular area. It should be understood that depending on the context, an MCTS may refer to the tile set within a picture or to the respective tile set in a sequence of pictures. The respective tile set may be, but in general need not be, collocated in the sequence of pictures.

It is noted that sample locations used in inter prediction may be saturated by the encoding and/or decoding process so that a location that would be outside the picture otherwise is saturated to point to the corresponding boundary sample of the picture. Hence, when a tile boundary is also a picture boundary, in some use cases, encoders may allow motion vectors to effectively cross that boundary or a motion vector to effectively cause fractional sample interpolation that would refer to a location outside that boundary, since the sample locations are saturated onto the boundary. In other use cases, specifically when a coded tile may be extracted from a bitstream where it is located on a position adjacent to a picture boundary to another bitstream where the tile is located on a position that is not adjacent to a picture boundary, encoders may constrain the motion vectors on picture boundaries similarly to any MCTS boundaries.

The temporal motion-constrained tile sets SEI message of HEVC can be used to indicate the presence of motion-constrained tile sets in the bitstream.

The decoder reconstructs the output video by applying prediction means similar to the encoder to form a predicted representation of the pixel blocks (using the motion or spatial information created by the encoder and stored in the compressed representation) and prediction error decoding (inverse operation of the prediction error coding recovering the quantized prediction error signal in spatial pixel domain). After applying prediction and prediction error decoding means the decoder sums up the prediction and prediction error signals (pixel values) to form the output video frame. The decoder (and encoder) may also apply additional filtering means to improve the quality of the output video before passing it for display and/or storing it as prediction reference for the forthcoming frames in the video sequence.

The filtering may, for example, include one more of the following: deblocking, sample adaptive offset (SAO), and/or adaptive loop filtering (ALF). H.264/AVC includes a deblocking, whereas HEVC includes both deblocking and SAO.

In typical video codecs, the motion information is indicated with motion vectors associated with each motion compensated image block, such as a prediction unit. Each of these motion vectors represents the displacement of the image block in the picture to be coded (in the encoder side) or decoded (in the decoder side) and the prediction source block in one of the previously coded or decoded pictures. In order to represent motion vectors efficiently those are typically coded differentially with respect to block specific predicted motion vectors. In typical video codecs, the predicted motion vectors are created in a predefined way, for example, calculating the median of the encoded or decoded motion vectors of the adjacent blocks. Another way to create motion vector predictions is to generate a list of candidate predictions from adjacent blocks and/or co-located blocks in temporal reference pictures and signalling the chosen candidate as the motion vector predictor. In addition, to predicting the motion vector values, it can be predicted which reference picture(s) are used for motion-compensated prediction and this prediction information may be represented, for example, by a reference index of previously coded/decoded picture. The reference index is typically predicted from adjacent blocks and/or co-located blocks in temporal reference picture. Moreover, typical high efficiency video codecs employ an additional motion information coding/decoding mechanism, often called merging/merge mode, where all the motion field information, which includes motion vector and corresponding reference picture index for each available reference picture list, is predicted and used without any modification/correction. Similarly, predicting the motion field information is carried out using the motion field information of adjacent blocks and/or co-located blocks in temporal reference pictures and the used motion field information is signalled among a list of motion field candidate list filled with motion field information of available adjacent/co-located blocks.

In typical video codecs, the prediction residual after motion compensation is first transformed with a transform kernel (like DCT) and then coded. The reason for this is that often there still exists some correlation among the residual and transform can in many cases help reduce this correlation and provide more efficient coding.

Typical video encoders utilize Lagrangian cost functions to find optimal coding modes, e.g., the desired coding mode for a block and associated motion vectors. This kind of cost function uses a weighting factor to tie together the (exact or estimated) image distortion due to lossy coding methods and the (exact or estimated) amount of information that is required to represent the pixel values in an image area:

$$C = D + \lambda R, \quad (1)$$

where C is the Lagrangian cost to be minimized, D is the image distortion (e.g., mean squared error) with the mode and motion vectors considered, and R the number of bits needed to represent the required data to reconstruct the image block in the decoder (including the amount of data to represent the candidate motion vectors).

Video coding standards and specifications may allow encoders to divide a coded picture to coded slices or alike. In-picture prediction is typically disabled across slice boundaries. Thus, slices can be regarded as a way to split a coded picture to independently decodable pieces. In H.264/AVC and HEVC, in-picture prediction may be disabled across slice boundaries. Thus, slices can be regarded as a way to split a coded picture into independently decodable pieces, and slices are therefore often regarded as elementary units for transmission. In many cases, encoders may indicate in the bitstream which types of in-picture prediction are turned off across slice boundaries, and the decoder operation takes this information into account, for example, when concluding which prediction sources are available. For example, samples from a neighboring CU may be regarded as unavailable for intra prediction, if the neighboring CU resides in a different slice.

An elementary unit for the output of an H.264/AVC or HEVC encoder and the input of an H.264/AVC or HEVC decoder, respectively, is a Network Abstraction Layer (NAL) unit. For transport over packet-oriented networks or storage into structured files, NAL units may be encapsulated into packets or similar structures. A bytestream format has been specified in H.264/AVC and HEVC for transmission or storage environments that do not provide framing structures. The bytestream format separates NAL units from each other by attaching a start code in front of each NAL unit. To avoid false detection of NAL unit boundaries, encoders run a byte-oriented start code emulation prevention algorithm, which adds an emulation prevention byte to the NAL unit payload if a start code would have occurred otherwise. In order to enable straightforward gateway operation between packet- and stream-oriented systems, start code emulation prevention may always be performed regardless of whether the bytestream format is in use or not. A NAL unit may be defined as a syntax structure including an indication of the type of data to follow and bytes including that data in the form of an RBSP interspersed as necessary with emulation prevention bytes. A raw byte sequence payload (RBSP) may be defined as a syntax structure including an integer number of bytes that is encapsulated in a NAL unit. An RBSP is either empty or has the form of a string of data bits including syntax elements followed by an RBSP stop bit and followed by zero or more subsequent bits equal to 0.

NAL units consist of a header and payload. In H.264/AVC and HEVC, the NAL unit header indicates the type of the NAL unit In HEVC, a two-byte NAL unit header is used for all specified NAL unit types. The NAL unit header includes one reserved bit, a six-bit NAL unit type indication, a three-bit nuh_temporal_id_plus1 indication for temporal level (may be required to be greater than or equal to 1) and a six-bit nuh_layer_id syntax element. The temporal_id_plus1 syntax element may be regarded as a temporal identifier for the NAL unit, and a zero-based TemporalId variable may be derived as follows: TemporalId=temporal_id_plus1−1. The abbreviation TID may be used to interchangeably with the TemporalId variable. TemporalId equal to 0 corresponds to the lowest temporal level. The value of temporal_id_plus1 is required to be non-zero in order to avoid start code emulation involving the two NAL unit header bytes. The bitstream created by excluding all VCL NAL units having a TemporalId greater than or equal to a selected value and including all other VCL NAL units remains conforming. Consequently, a picture having TemporalId equal to tid_value does not use any picture having a TemporalId greater than tid_value as inter prediction reference. A sub-layer or a temporal sub-layer may be defined to be a temporal scalable layer (or a temporal layer, TL) of a temporal scalable bitstream, including VCL NAL units with a particular value of the TemporalId variable and the associated non-VCL NAL units. nuh_layer_id may be understood as a scalability layer identifier.

NAL units can be categorized into Video Coding Layer (VCL) NAL units and non-VCL NAL units. VCL NAL units are typically coded slice NAL units. In HEVC, VCL NAL units include syntax elements representing one or more CU.

In HEVC, abbreviations for picture types may be defined as follows: trailing (TRAIL) picture, temporal sub-layer access (TSA), step-wise temporal sub-layer access (STSA), random access decodable leading (RADL) picture, random access skipped leading (RASL) picture, Broken Link Access (BLA) picture, Instantaneous Decoding Refresh (IDR) picture, Clean Random Access (CRA) picture.

A random access point (RAP) picture, which may also be referred to as an intra random access point (IRAP) picture in an independent layer include only intra-coded slices. An IRAP picture belonging to a predicted layer may include P, B, and I slices, cannot use inter prediction from other pictures in the same predicted layer, and may use inter-layer prediction from its direct reference layers. In the present version of HEVC, an IRAP picture may be a BLA picture, a CRA picture or an IDR picture. The first picture in a bitstream including a base layer is an IRAP picture at the base layer. Provided the necessary parameter sets are available when they need to be activated, an IRAP picture at an independent layer and all subsequent non-RASL pictures at the independent layer in decoding order can be correctly decoded without performing the decoding process of any pictures that precede the IRAP picture in decoding order. The IRAP picture belonging to a predicted layer and all subsequent non-RASL pictures in decoding order within the same predicted layer can be correctly decoded without performing the decoding process of any pictures of the same predicted layer that precede the IRAP picture in decoding order, when the necessary parameter sets are available when they need to be activated and when the decoding of each direct reference layer of the predicted layer has been initialized. There may be pictures in a bitstream that include only intra-coded slices that are not IRAP pictures.

A non-VCL NAL unit may be, for example, one of the following types: a sequence parameter set, a picture parameter set, a supplemental enhancement information (SEI) NAL unit, an access unit delimiter, an end of sequence NAL unit, an end of bitstream NAL unit, or a filler data NAL unit. Parameter sets may be needed for the reconstruction of decoded pictures, whereas many of the other non-VCL NAL units are not necessary for the reconstruction of decoded sample values.

Parameters that remain unchanged through a coded video sequence may be included in a sequence parameter set. In addition to the parameters that may be needed by the decoding process, the sequence parameter set may optionally include video usability information (VUI), which includes parameters that may be important for buffering, picture output timing, rendering, and resource reservation. In HEVC a sequence parameter set RBSP includes parameters that may be referred to by one or more picture parameter set RBSPs or one or more SEI NAL units including a buffering period SEI message. A picture parameter set includes such parameters that are likely to be unchanged in several coded pictures. A picture parameter set RBSP may include parameters that can be referred to by the coded slice NAL units of one or more coded pictures.

In HEVC, a video parameter set (VPS) may be defined as a syntax structure including syntax elements that apply to zero or more entire coded video sequences as determined by the content of a syntax element found in the SPS referred to by a syntax element found in the PPS referred to by a syntax element found in each slice segment header.

A video parameter set RBSP may include parameters that can be referred to by one or more sequence parameter set RBSPs.

The relationship and hierarchy between video parameter set (VPS), sequence parameter set (SPS), and picture parameter set (PPS) may be described as follows. VPS resides one level above SPS in the parameter set hierarchy and in the context of scalability and/or 3D video. VPS may include parameters that are common for all slices across all (scalability or view) layers in the entire coded video sequence. SPS includes the parameters that are common for all slices in a particular (scalability or view) layer in the entire coded video sequence, and may be shared by multiple (scalability or view) layers. PPS includes the parameters that are common for all slices in a particular layer representation (the representation of one scalability or view layer in one access unit) and are likely to be shared by all slices in multiple layer representations.

VPS may provide information about the dependency relationships of the layers in a bitstream, as well as many other information that are applicable to all slices across all (scalability or view) layers in the entire coded video sequence. VPS may be considered to comprise two parts, the base VPS and a VPS extension, where the VPS extension may be optionally present.

Out-of-band transmission, signaling or storage can additionally or alternatively be used for other purposes than tolerance against transmission errors, such as ease of access or session negotiation. For example, a sample entry of a track in a file conforming to the ISO base media file format may comprise parameter sets, while the coded data in the bitstream is stored elsewhere in the file or in another file. The phrase along the bitstream (e.g., indicating along the bitstream) may be used in claims and described embodiments to refer to out-of-band transmission, signaling, or storage in a manner that the out-of-band data is associated with the bitstream. The phrase decoding along the bitstream or alike may refer to decoding the referred out-of-band data (which may be obtained from out-of-band transmission, signaling, or storage) that is associated with the bitstream.

A SEI NAL unit may include one or more SEI messages, which are not required for the decoding of output pictures but may assist in related processes, such as picture output timing, rendering, error detection, error concealment, and resource reservation. Several SEI messages are specified in H.264/AVC and HEVC, and the user data SEI messages enable organizations and companies to specify SEI messages for their own use. H.264/AVC and HEVC include the syntax and semantics for the specified SEI messages but no process for handling the messages in the recipient is defined. Consequently, encoders are required to follow the H.264/AVC standard or the HEVC standard when they create SEI messages, and decoders conforming to the H.264/AVC standard or the HEVC standard, respectively, are not required to process SEI messages for output order conformance One of the reasons to include the syntax and semantics of SEI messages in H.264/AVC and HEVC is to allow different system specifications to interpret the supplemental information identically and hence interoperate. It is intended that system specifications can require the use of particular SEI messages both in the encoding end and in the decoding end, and additionally the process for handling particular SEI messages in the recipient may be specified.

In HEVC, there are two types of SEI NAL units, namely the suffix SEI NAL unit and the prefix SEI NAL unit, having a different nal_unit_type value from each other. The SEI message(s) included in a suffix SEI NAL unit are associated with the VCL NAL unit preceding, in decoding order, the suffix SEI NAL unit. The SEI message(s) included in a prefix SEI NAL unit are associated with the VCL NAL unit following, in decoding order, the prefix SEI NAL unit.

A coded picture is a coded representation of a picture.

In HEVC, a coded picture may be defined as a coded representation of a picture including all coding tree units of the picture. In HEVC, an access unit (AU) may be defined as a set of NAL units that are associated with each other according to a specified classification rule, are consecutive in decoding order, and include at most one picture with any specific value of nuh_layer_id. In addition to including the VCL NAL units of the coded picture, an access unit may also including non-VCL NAL units. Said specified classification rule may, for example, associate pictures with the same output time or picture output count value into the same access unit.

A bitstream may be defined as a sequence of bits, in the form of a NAL unit stream or a byte stream, that forms the representation of coded pictures and associated data forming one or more coded video sequences. A first bitstream may be followed by a second bitstream in the same logical channel, such as in the same file or in the same connection of a communication protocol. An elementary stream (in the context of video coding) may be defined as a sequence of one or more bitstreams. The end of the first bitstream may be indicated by a specific NAL unit, which may be referred to as the end of bitstream (EOB) NAL unit and which is the last NAL unit of the bitstream. In HEVC and its current draft extensions, the EOB NAL unit is required to have nuh_layer_id equal to 0.

A coded video sequence may be defined as such a sequence of coded pictures in decoding order that is independently decodable and may be followed by another coded video sequence or the end of the bitstream or an end of sequence NAL unit.

In HEVC, a coded video sequence may additionally or alternatively (to the specification above) be specified to end, when a specific NAL unit, which may be referred to as an end of sequence (EOS) NAL unit, appears in the bitstream and has nuh_layer_id equal to 0.

A group of pictures (GOP) and its characteristics may be defined as follows. A GOP can be decoded regardless of whether any previous pictures were decoded. An open GOP is such a group of pictures in which pictures preceding the initial intra picture in output order might not be correctly decodable when the decoding starts from the initial intra picture of the open GOP. In other words, pictures of an open GOP may refer (in inter prediction) to pictures belonging to a previous GOP. An HEVC decoder can recognize an intra picture starting an open GOP, because a specific NAL unit type, CRA NAL unit type, may be used for its coded slices. A closed GOP is such a group of pictures in which all pictures can be correctly decoded when the decoding starts from the initial intra picture of the closed GOP. In other words, no picture in a closed GOP refers to any pictures in previous GOPs. In H.264/AVC and HEVC, a closed GOP may start from an IDR picture. In HEVC a closed GOP may also start from a BLA_W_RADL or a BLA_N_LP picture. An open GOP coding structure is potentially more efficient in the compression compared to a closed GOP coding structure, due to a larger flexibility in selection of reference pictures.

A structure of pictures (SOP) may be defined as one or more coded pictures consecutive in decoding order, in which the first coded picture in decoding order is a reference picture at the lowest temporal sub-layer and no coded picture except potentially the first coded picture in decoding order is a RAP picture. All pictures in the previous SOP precede in decoding order all pictures in the current SOP and all pictures in the next SOP succeed in decoding order all pictures in the current SOP. A SOP may represent a hierarchical and repetitive inter prediction structure. The term group of pictures (GOP) may sometimes be used interchangeably with the term SOP and having the same semantics as the semantics of SOP.

A decoded picture buffer (DPB) may be used in the encoder and/or in the decoder. There are two reasons to buffer decoded pictures, for references in inter prediction and for reordering decoded pictures into output order. As H.264/AVC and HEVC provide a great deal of flexibility for both reference picture marking and output reordering, separate buffers for reference picture buffering and output picture buffering may waste memory resources. Hence, the DPB may include a unified decoded picture buffering process for reference pictures and output reordering. A decoded picture may be removed from the DPB when it is no longer used as a reference and is not needed for output.

Some codecs use a concept of picture order count (POC). A value of POC is derived for each picture and is non-decreasing with increasing picture position in output order. POC therefore indicates the output order of pictures. POC may be used in the decoding process, for example, for implicit scaling of motion vectors and for reference picture list initialization. Furthermore, POC may be used in the verification of output order conformance.

In many coding modes of H.264/AVC and HEVC, the reference picture for inter prediction is indicated with an index to a reference picture list. The index may be coded with variable length coding, which usually causes a smaller index to have a shorter value for the corresponding syntax element. In H.264/AVC and HEVC, two reference picture lists (reference picture list 0 and reference picture list 1) are generated for each bi-predictive (B) slice, and one reference picture list (reference picture list 0) is formed for each inter-coded (P) slice.

A reference picture list, such as the reference picture list 0 and the reference picture list 1, may be constructed in two steps: First, an initial reference picture list is generated. The initial reference picture list may be generated, for example, on the basis of frame_num, POC, temporal_id, or information on the prediction hierarchy such as a GOP structure, or any combination thereof. Second, the initial reference picture list may be reordered by reference picture list reordering (RPLR) syntax, also known as reference picture list modification syntax structure, which may be included in slice headers. The initial reference picture lists may be modified through the reference picture list modification syntax structure, where pictures in the initial reference picture lists may be identified through an entry index to the list.

Many coding standards, including H.264/AVC and HEVC, may have decoding process to derive a reference picture index to a reference picture list, which may be used to indicate which one of the multiple reference pictures is used for inter prediction for a particular block. A reference picture index may be coded by an encoder into the bitstream in some inter coding modes or it may be derived (by an encoder and a decoder), for example, using neighboring blocks in some other inter coding modes.

Several candidate motion vectors may be derived for a single prediction unit. For example, motion vector prediction HEVC includes two motion vector prediction schemes, namely the advanced motion vector prediction (AMVP) and the merge mode. In the AMVP or the merge mode, a list of motion vector candidates is derived for a PU. There are two kinds of candidates: spatial candidates and temporal candidates, where temporal candidates may also be referred to as TMVP candidates.

A candidate list derivation may be performed, for example, as follows, while it should be understood that other possibilities may exist for candidate list derivation. When the occupancy of the candidate list is not at maximum, the spatial candidates are included in the candidate list first when they are available and not already exist in the candidate list. After that, when occupancy of the candidate list is not yet at when, a temporal candidate is included in the candidate list. When the number of candidates still does not reach the maximum allowed number, the combined bi-predictive candidates (for B slices) and a zero motion vector are added in. After the candidate list has been constructed, the encoder decides the final motion information from candidates for example based on a rate-distortion optimization (RDO) decision and encodes the index of the selected candidate into the bitstream. Likewise, the decoder decodes the index of the selected candidate from the bitstream, constructs the candidate list, and uses the decoded index to select a motion vector predictor from the candidate list.

In reference picture resampling (RPR), which may also be called adaptive resolution change (ARC), the decoding process of a picture may refer to one or more previous reference pictures that have a different spatial resolution for inter prediction. Consequently, a resampling of the reference pictures for operation of the inter-picture prediction process may be applied. In general, resampling may be either picture-wise or block-wise. In picture-wise resampling, an entire reference picture is resampled, whereas in block-wise resampling, an area within a reference picture, such as a reference block for motion compensation, is resampled. The block-wise resampling may be performed as a part of the motion compensation process. Resampling may generally comprise downsampling and upsampling.

VVC enables picture resolution change within a sequence at a position without encoding an IRAP picture, which is always intra-coded in an independent layer. This feature is sometimes referred to as reference picture resampling (RPR), as the feature needs resampling of a reference picture used for inter prediction when that reference picture has a different resolution than the current picture being decoded. In order to avoid additional processing steps, the RPR process in VVC is designed to be embedded in the motion compensation process and performed at the block level. In the motion compensation stage, the scaling ratio is used together with motion information to locate the reference samples in the reference picture to be used in the interpolation process.

In VVC, the scaling ratio is restricted to be larger than or equal to ½ (2 times downsampling from the reference picture to the current picture), and less than or equal to 8 (8 times upsampling). Three sets of resampling filters with different frequency cutoffs are specified to handle various scaling ratios between a reference picture and the current picture. The three sets of resampling filters are applied respectively for the scaling ratio ranging from ½ to 1/1.75, from 1/1.75 to 1/1.25, and from 1/1.25 to 8. Each set of resampling filters has 16 phases for luma and 32 phases for chroma which is the same to the case of motion compensation interpolation filters. It is worthy to note that the filter set of normal motion compensation (MC) interpolation is used in the case of scaling ratio ranging from 1/1.25 to 8. Actually, the normal MC interpolation process is a special case of the resampling process with scaling ratio ranging from 1/1.25 to 8. The horizontal and vertical scaling ratios are derived based on picture width and height, and the left, right, top and bottom scaling offsets specified for the reference picture and the current picture. Scaling window for each picture is calculated by adding the scaling offset to the picture size. Then the scaling ratio is derived by dividing the scaling window on the reference frame to that of the current frame.

A scaling window may be signaled for and associated with a picture. Scaling windows of a picture and its reference picture may indicate the spatial correspondence between the pictures. Scaling windows may be used to achieve one or both of the following: i) a horizontal scaling ratio and a vertical scaling ratio may be derived based on the width ratio and the height ratio, respectively, of the scaling windows; ii) a left offset and a top offset for inter prediction may be derived. The horizontal and vertical scaling ratios may be used as resampling ratios for RPR. The left and top offsets may be used in deriving a spatial correspondence between a picture and its reference picture. The left and top offsets may be added in the reference picture location derivation through a motion vector scaled by a scaling ratio. For example, the top-left corner of the current block is mapped to the respective "anchor location" in the reference picture through the left and top offsets, and a motion vector scaled by a scaling ratio is then applied to obtain a reference block in relation to anchor location. In general, the scaling ratio may be 1:1, in which case the left and top offsets may be applied without resampling. It needs to be understood that there may be other means to signal scaling ratio(s), top offset, and/or left offset than scaling windows.

In VVC, a scaling window may be indicated in a PPS explicitly or implicitly. When indicated explicitly, pps_scaling_win_left_offset, pps_scaling_win_right_offset, pps_scaling_win_top_offset, and pps_scaling_win_bottom_offset specify the offsets of the scaling window boundaries relative to the left, right, top, and bottom boundaries of the conformance cropping window, respectively. When indicated implicitly, the scaling window is inferred to be identical to the conformance cropping window.

A decoder and/or a hypothetical reference decoder (HRD) of a video coding specification may comprise a picture output process. The output process may be considered to be a process in which the decoder provides decoded and cropped pictures as the output of the decoding process. The output process may be a part of video coding standards, e.g., as a part of the hypothetical reference decoder specification. In output cropping, lines and/or columns of samples may be removed from decoded pictures according to a cropping rectangle to form output pictures. A cropped decoded picture may be defined as the result of cropping a decoded picture based on the conformance cropping window specified e.g., in the sequence parameter set that is referred to by the corresponding coded picture. Hence, it may be considered that the conformance cropping window specifies the cropping rectangle to form output pictures from decoded pictures.

In order to support of RPR in VVC, the picture resolution and the corresponding conformance window are signalled in the PPS instead of in the SPS, while in the SPS the maximum picture resolution is signalled.

Scalable video coding may refer to coding structure where one bitstream may include multiple representations of the content, for example, at different bitrates, resolutions or frame rates. In these cases the receiver can extract the desired representation depending on its characteristics (e.g., resolution that matches best the display device). Alternatively, a server or a network element can extract the portions of the bitstream to be transmitted to the receiver depending on, e.g., the network characteristics or processing capabilities of the receiver. A meaningful decoded representation can be produced by decoding only certain parts of a scalable bit stream. A scalable bitstream typically consists of a 'base layer' providing the lowest quality video available and one or more enhancement layers that enhance the video quality when received and decoded together with the lower layers. In order to improve coding efficiency for the enhancement layers, the coded representation of that layer typically depends on the lower layers. For example, the motion and mode information of the enhancement layer can be predicted from lower layers. Similarly the pixel data of the lower layers can be used to create prediction for the enhancement layer.

In some scalable video coding schemes, a video signal can be encoded into a base layer and one or more enhancement layers. An enhancement layer may enhance, for example, the temporal resolution (i.e., the frame rate), the spatial resolution, or simply the quality of the video content represented by another layer or part thereof. Each layer together with all its dependent layers is one representation of the video signal, for example, at a certain spatial resolution, temporal resolution and quality level. In this document, we refer to a scalable layer together with all of its dependent layers as a "scalable layer representation". The portion of a scalable bitstream corresponding to a scalable layer representation can be extracted and decoded to produce a representation of the original signal at certain fidelity.

Scalability modes or scalability dimensions may include, but are not limited, to the following:

Quality scalability: Base layer pictures are coded at a lower quality than enhancement layer pictures, which may be achieved for example using a greater quantization parameter value (e.g., a greater quantization step size for transform coefficient quantization) in the base layer than in the enhancement layer. Quality scalability may be further categorized into fine-grain or fine-granularity scalability (FGS), medium-grain or medium-granularity scalability (MGS), and/or coarse-grain or coarse-granularity scalability (CGS), as described below.

Spatial scalability: Base layer pictures are coded at a lower resolution (e.g., have fewer samples) than enhancement layer pictures. Spatial scalability and quality scalability, particularly its coarse-grain scalability type, may sometimes be considered the same type of scalability.

View scalability, which may also be referred to as multiview coding. The base layer represents a first view, whereas an enhancement layer represents a second view. A view may be defined as a sequence of pictures representing one camera or viewpoint. It may be considered that in stereoscopic or two-view video, one video sequence or view is presented for the left eye while a parallel view is presented for the right eye.

Depth scalability, which may also be referred to as depth-enhanced coding. A layer or some layers of a bitstream may represent texture view(s), while other layer or layers may represent depth view(s).

It should be understood that many of the scalability types may be combined and applied together.

The term layer may be used in context of any type of scalability, including view scalability and depth enhancements. An enhancement layer may refer to any type of an enhancement, such as SNR, spatial, multiview, and/or depth enhancement. A base layer may refer to any type of a base video sequence, such as a base view, a base layer for SNR/spatial scalability, or a texture base view for depth-enhanced video coding.

A sender, a gateway, a client, or another entity may select the transmitted layers and/or sub-layers of a scalable video bitstream. Terms layer extraction, extraction of layers, or layer down-switching may refer to transmitting fewer layers than what is available in the bitstream received by the sender, the gateway, the client, or another entity. Layer up-switching may refer to transmitting additional layer(s) compared to those transmitted prior to the layer up-switching by the sender, the gateway, the client, or another entity, e.g., restarting the transmission of one or more layers whose transmission was ceased earlier in layer down-switching. Similar to layer down-switching and/or up-switching, the sender, the gateway, the client, or another entity may perform down- and/or up-switching of temporal sub-layers. The sender, the gateway, the client, or another entity may also perform both layer and sub-layer down-switching and/or up-switching. Layer and sub-layer down-switching and/or up-switching may be carried out in the same access unit or alike (e.g., virtually simultaneously) or may be carried out in different access units or alike (e.g., virtually at distinct times).

A scalable video encoder for quality scalability (also known as Signal-to-Noise or SNR) and/or spatial scalability may be implemented as follows. For a base layer, a conventional non-scalable video encoder and decoder may be used. The reconstructed/decoded pictures of the base layer are included in the reference picture buffer and/or reference picture lists for an enhancement layer. In case of spatial scalability, the reconstructed/decoded base-layer picture may be upsampled prior to its insertion into the reference picture lists for an enhancement-layer picture. The base layer decoded pictures may be inserted into a reference picture list(s) for coding/decoding of an enhancement layer picture similarly to the decoded reference pictures of the enhancement layer. Consequently, the encoder may choose a base-layer reference picture as an inter prediction reference and indicate its use with a reference picture index in the coded bitstream. The decoder decodes from the bitstream, for example, from a reference picture index, that a base-layer picture is used as an inter prediction reference for the enhancement layer. When a decoded base-layer picture is used as the prediction reference for an enhancement layer, it is referred to as an inter-layer reference picture.

While the previous paragraph described a scalable video codec with two scalability layers with an enhancement layer and a base layer, it needs to be understood that the description can be generalized to any two layers in a scalability hierarchy with more than two layers. In this case, a second enhancement layer may depend on a first enhancement layer in encoding and/or decoding processes, and the first enhancement layer may therefore be regarded as the base layer for the encoding and/or decoding of the second enhancement layer. Furthermore, it needs to be understood that there may be inter-layer reference pictures from more than one layer in a reference picture buffer or reference picture lists of an enhancement layer, and each of these inter-layer reference pictures may be considered to reside in a base layer or a reference layer for the enhancement layer being encoded and/or decoded. Furthermore, it needs to be understood that other types of inter-layer processing than reference-layer picture upsampling may take place instead or additionally. For example, the bit-depth of the samples of the reference-layer picture may be converted to the bit-depth of the enhancement layer and/or the sample values may undergo a mapping from the color space of the reference layer to the color space of the enhancement layer.

A scalable video coding and/or decoding scheme may use multi-loop coding and/or decoding, which may be characterized as follows. In the encoding/decoding, a base layer picture may be reconstructed/decoded to be used as a motion-compensation reference picture for subsequent pictures, in coding/decoding order, within the same layer or as a reference for inter-layer (or inter-view or inter-component) prediction. The reconstructed/decoded base layer picture may be stored in the DPB. An enhancement layer picture may likewise be reconstructed/decoded to be used as a motion-compensation reference picture for subsequent pictures, in coding/decoding order, within the same layer or as reference for inter-layer (or inter-view or inter-component) prediction for higher enhancement layers, if any. In addition to reconstructed/decoded sample values, syntax element values of the base/reference layer or variables derived from the syntax element values of the base/reference layer may be used in the inter-layer/inter-component/inter-view prediction.

Inter-layer prediction may be defined as prediction in a manner that is dependent on data elements (e.g., sample values or motion vectors) of reference pictures from a different layer than the layer of the current picture (being encoded or decoded). Many types of inter-layer prediction exist and may be applied in a scalable video encoder/decoder. The available types of inter-layer prediction may for example depend on the coding profile according to which the bitstream or a particular layer within the bitstream is being encoded or, when decoding, the coding profile that the bitstream or a particular layer within the bitstream is indicated to conform to. Alternatively or additionally, the available types of inter-layer prediction may depend on the types of scalability or the type of an scalable codec or video coding standard amendment (e.g. SHVC, MV-HEVC, or 3D-HEVC) being used.

A direct reference layer may be defined as a layer that may be used for inter-layer prediction of another layer for which the layer is the direct reference layer. A direct predicted layer may be defined as a layer for which another layer is a direct reference layer. An indirect reference layer may be defined as a layer that is not a direct reference layer of a second layer but is a direct reference layer of a third layer that is a direct reference layer or indirect reference layer of a direct reference layer of the second layer for which the layer is the indirect reference layer. An indirect predicted layer may be defined as a layer for which another layer is an indirect reference layer. An independent layer may be defined as a layer that does not have direct reference layers. In other words, an independent layer is not predicted using inter-layer prediction. A non-base layer may be defined as any other layer than the base layer, and the base layer may be defined as the lowest layer in the bitstream. An independent non-base layer may be defined as a layer that is both an independent layer and a non-base layer.

Similarly to MVC, in MV-HEVC, inter-view reference pictures can be included in the reference picture list(s) of the current picture being coded or decoded. SHVC uses multi-loop decoding operation (unlike the SVC extension of H.264/AVC). SHVC may be considered to use a reference index based approach, i.e. an inter-layer reference picture can be included in a one or more reference picture lists of the current picture being coded or decoded (as described above).

For the enhancement layer coding, the concepts and coding tools of HEVC base layer may be used in SHVC, MV-HEVC, and/or alike. However, the additional inter-layer prediction tools, which employ already coded data (including reconstructed picture samples and motion parameters a.k.a motion information) in reference layer for efficiently coding an enhancement layer, may be integrated to SHVC, MV-HEVC, and/or alike codec.

A constituent picture may be defined as such part of an enclosing (de)coded picture that corresponds to a representation of an entire input picture. In addition to the constituent picture, the enclosing (de)coded picture may comprise other data, such as another constituent picture.

Frame packing may be defined to include arranging more than one input picture, which may be referred to as (input) constituent frames or constituent pictures, into an output picture. In general, frame packing is not limited to any particular type of constituent frames or the constituent frames need not have a particular relation with each other. In many cases, frame packing is used for arranging constituent frames of a stereoscopic video clip into a single picture sequence. The arranging may include placing the input pictures in spatially non-overlapping areas within the output picture. For example, in a side-by-side arrangement, two input pictures are placed within an output picture horizontally adjacently to each other. The arranging may also include partitioning of one or more input pictures into two or more constituent frame partitions and placing the constituent frame partitions in spatially non-overlapping areas within the output picture. The output picture or a sequence of frame-packed output pictures may be encoded into a bitstream e.g. by a video encoder. The bitstream may be decoded, e.g., by a video decoder. The decoder or a post-processing operation after decoding may extract the decoded constituent frames from the decoded picture(s) e.g. for displaying.

Video coding specifications may include a set of constraints for associating data units (e.g. NAL units in H.264/AVC or HEVC) into access units. These constraints may be used to conclude access unit boundaries from a sequence of NAL units. For example, the following is specified in the HEVC standard:
 An access unit includes one coded picture with nuh_layer_id equal to 0, zero or more VCL NAL units with nuh_layer_id greater than 0 and zero or more non-VCL NAL units;
 Let firstBlPicNalUnit be the first VCL NAL unit of a coded picture with nuh_layer_id equal to 0. The first of any of the following NAL units preceding firstBlPicNalUnit and succeeding the last VCL NAL unit preceding firstBlPicNalUnit, when present, specifies the start of a new access unit;
 access unit delimiter NAL unit with nuh_layer_id equal to 0 (when present);
 VPS NAL unit with nuh_layer_id equal to 0 (when present);
 SPS NAL unit with nuh_layer_id equal to 0 (when present);
 PPS NAL unit with nuh_layer_id equal to 0 (when present);
 Prefix SEI NAL unit with nuh_layer_id equal to 0 (when present);
 NAL units with nal_unit_type in the range of RSV_NVCL41 . . . RSV_NVCL44 with nuh_layer_id equal to 0 (when present);
 NAL units with nal_unit_type in the range of UNSPEC 48 . . . UNSPEC55 with nuh_layer_id equal to 0 (when present);
 The first NAL unit preceding firstBlPicNalUnit and succeeding the last VCL NAL unit preceding firstBlPicNalUnit, when present, may be one of the above-listed NAL units; and
 When there is none of the above NAL units preceding firstBlPicNalUnit and succeeding the last VCL NAL preceding firstBlPicNalUnit, when present, firstBlPicNalUnit starts a new access unit.

The HEIF specification (e.g., Annex K) provides a method for performing progressive rendering using the 'altr' group mechanism however it does not provide any mechanism for performing progressive rendering in a spatial manner.

m56028 provides a solution for progressive rendering of simple images using the 'altr' group mechanism as defined in annex K of the HEIF specification. It also additionally expects to define a brand which further constraints the mechanism in annex K. However, the solution provided may be applicable to simple images and may not work for derived image items such as the grid item and the overlay item.

The HEIF working draft of amendment MDS_21323_WG_03_N0507, m56773, m57385, m58106 and m58879 provides a solution for progressive rendering of images in the HEIF image file format by specifying the progressive derived image item and the progressive rendering entity group. However, it does not provide any provision for the player to choose and playback the whole image in highest quality/resolution.

Some embodiments of this invention are described using the following example. In an embodiment, an image may be encoded into multiple representations where each representation may have either different quality, different resolution, or both from other representations. In an embodiment, among the multiple representations of the image, there is at least one representation which is encoded independently of other representations and this representation may have the lowest quality, resolution, both. In an embodiment, among the multiple representations of the image, there is at least one representation of the image which has a high quality or resolution and may be divided into multiple spatial regions.

Figure 7:
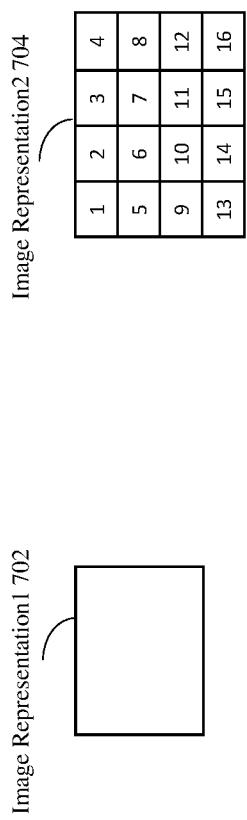
FIG. 7 illustrates example representations of an image, in accordance with an embodiment.

FIG. 7 illustrates example representations of an image, in accordance with an embodiment. As shown in FIG. 7, there are two representations of the image where representation1 702 is encoded independently of representation2 704 and is encoded at a lower quality level from representation2 704. The representation1 702 may have a lower or equal resolution as compared to the image in representation2 704. In this example, the image in representation2 704 is divided into 16 regions, but embodiments are not limited to any particular number of regions, and it would be understood that the representation2 may be divided into more or less than 16 regions (numbered, for example, from 1 to 16). The representation1 702 and/or the representation2 704 may be understood to be input images for encoding, one or more encoded images, or decoded images, depending on the context they are referenced.

Figure 8A:
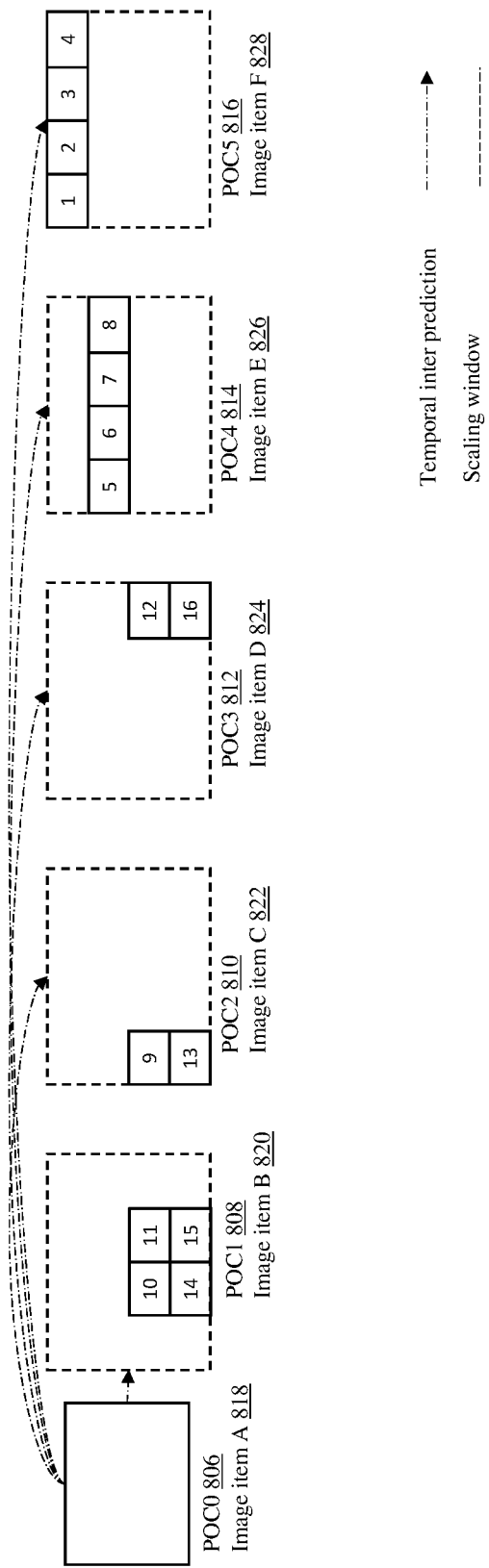
FIGS. 8a to 8c illustrate examples of progressive rendering, in accordance with various embodiments.
Figure 8B:
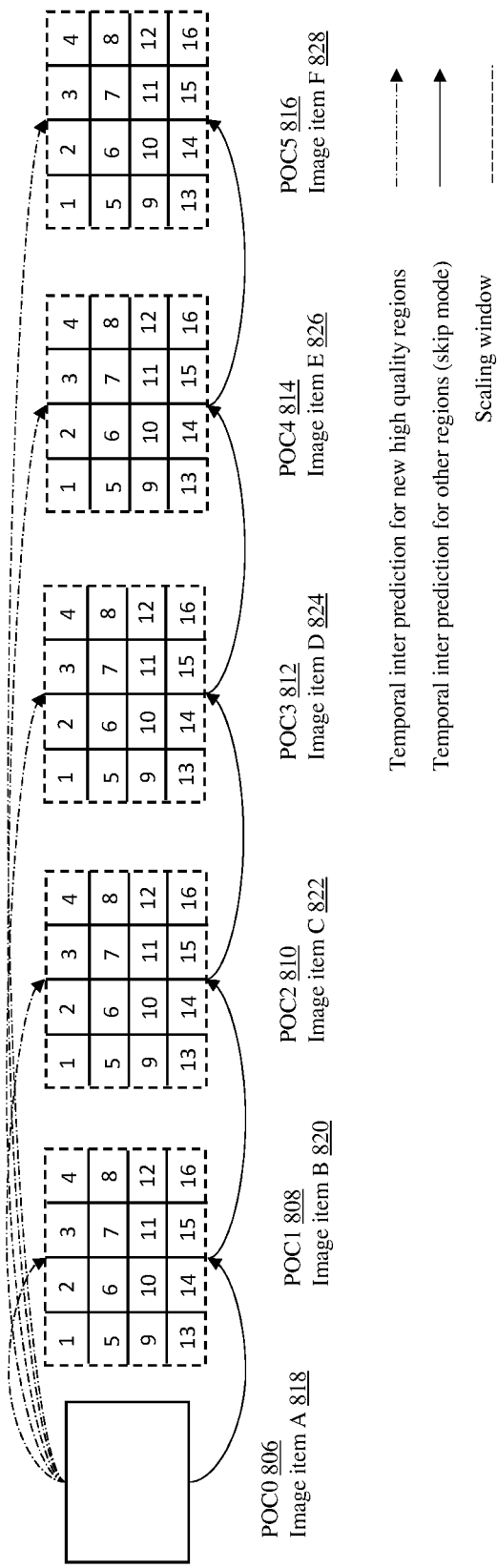
Figure 8C:
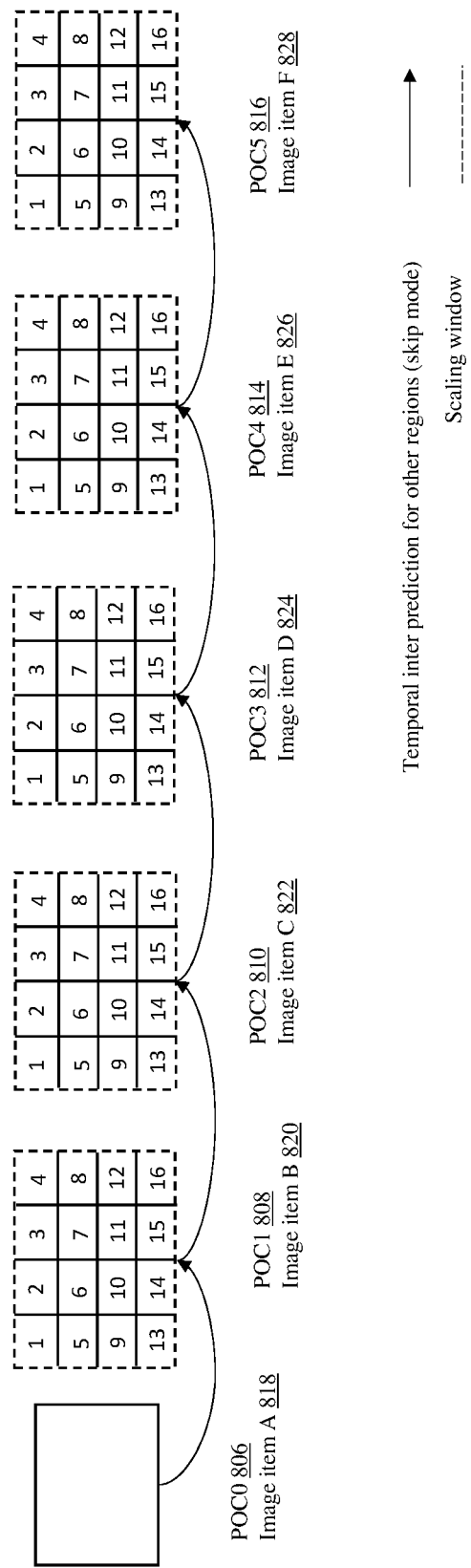

FIGS. 8a to 8c illustrate examples of progressive rendering, in accordance with various embodiments. In the embodiment of FIG. 8a, to achieve progressive rendering with representation1 702 and representation2 704 of the image, by using a single decoder to decode both the representation1 702 and the representation2 704 of the image, an entity, apparatus, or content author may choose to encode the different regions of representation2 704 to be dependent of the representation1 702. In an example embodiment, to achieve the single decoder representation, one encoding arrangement that may be used is shown in FIG. 8*a*. In an example embodiment, the image of representation1 702 is encoded as a first picture of the bitstream, which may be denoted as POC0 806 in this example, but embodiments are not limited to any particular picture order count (POC) value or the presence of POC in the coding format. In an example embodiment, each region or a group of regions in the representation2 704 is encoded based on the representation1 702 image of POC0 806 (e.g., the image denoted as POC0 used as reference picture for prediction of the image of representation2 704) in the following POC positions. For example, regions 10, 11, 14 and 15 are encoded in a picture (denoted as POC1 808), by using the representation1 702 of POC0 806 as a reference picture. Similarly, regions 9 and 13 are encoded in a picture (denoted as POC2 810) by using the representation1 702 of POC0 806 as a reference picture; regions 12 and 16 are encoded in a picture (denoted as POC3 812) by using the representation1 702 of POC0 806 as a reference picture; regions 5, 6, 7, and 8 are encoded in a picture (denoted as POC4 814) by using the representation1 702 of POC0 806 as a reference picture; regions 1, 2, 3, and 4 are encoded in a picture (denoted as POC5 816) by using the representation1 702 of POC0 806 as a reference picture. In this embodiment, the reference numbers POC0 806 to POC5 816 refer to encoded pictures denoted as the POC values, not the POC values. In an example embodiment, such an encoding may be achieved, for example, by using a scaling window concept of the VVC specification. Although the embodiments specified here uses VVC scaling windows as an example, the embodiments are applicable to any encoding configuration/video codec specification which allows for such an encoding of regions.

In another example embodiment, to achieve the single decoder representation without need for overlaying, one encoding arrangement that may be used is shown in FIG. 8*b*, where each picture representing the whole image, and the received high quality (e.g., the representation2 704) regions are accumulatively kept in that picture, and a rest of the image is represented with lower quality (e.g., representation1 702). In an example embodiment, the image of representation1 702 is encoded as a first picture of the bitstream, which may be denoted as POC0 806 in this example, but embodiments are not limited to any particular picture order count (POC) value or the presence of POC in the coding format. In an example embodiment, each region or a group of regions in the representation2 704 is encoded based on the representation1 702 image of POC0 806 (e.g., the image denoted as POC0 806 used as reference picture for prediction of the image of representation2 704) in the following POC positions, and other regions or group of regions in each POC are encoded based on the previously encoded picture in a mode with the lowest possible bit (e.g. skip mode with no residual), for example, just to copy the samples from previous picture to this picture. To achieve this very low bit encoding, quantization parameter may be set to maximum value. For these very low bit encoded regions, loop filters such as deblocking filter, sample adaptive offset, and adaptive loop filer may be disabled. Encoding in skip mode requires minimum number of bits and is equivalent of copy the content from previous picture (after resampling, when needed). For example, regions 10, 11, 14 and 15 are encoded in a picture (denoted as POC1 808), by using the representation1 702 of POC0 806 as a reference picture. The other regions of POC1 are encoded in skip mode with no residual, by using the representation1 702 of POC0 806 as a reference picture. Similarly, regions 9 and 13 are encoded in a picture (denoted as POC2 810) by using the representation1 702 of POC0 806 as a reference picture; and other regions of POC2 810 are encoded in skip mode with no residual, by using the POC1 808 as a reference picture. As a result, regions 10, 11, 14, and 15 in POC2 810 are copied from corresponding high quality regions in POC1, and the remaining regions (e.g., 1-8, 12, and 16) are copied from corresponding low quality regions in POC1. Regions 12 and 16 are encoded in a picture (denoted as POC3 812) by using the representation1 702 of POC0 806 as a reference picture, and regions 9-11, and 13-15 are copied from corresponding high quality regions in POC2, and regions 1-8 are copied from corresponding low quality regions in POC2; regions 5, 6, 7, and 8 are encoded in a picture (denoted as POC4 814) by using the representation1 702 of POC0 806 as a reference picture, and regions 9-16 are copied from corresponding high quality regions in POC2, and regions 1-4 are copied from corresponding low quality regions in POC2; regions 1, 2, 3, and 4 are encoded in a picture (denoted as POC5 816) by using the representation1 702 of POC0 806 as a reference picture, and regions 5-16 are copied from corresponding high quality regions in POC2. In this embodiment, the reference numbers POC0 806 to POC5 816 refer to encoded pictures denoted as the POC values, not the POC values. In an example embodiment, such an encoding may be achieved, for example, by using a scaling window concept of the VVC specification. Although the embodiments specified here uses VVC scaling windows as an example, the embodiments are applicable to any encoding configuration/video codec specification which allows for such an encoding of regions or pictures with different resolution. In this case, scaling window may not be signaled in the bitstream, so the scaling window in each picture is inferred to cover the whole picture. In this embodiment, different picture regions have different reference picture. For example, in POC2 810, regions 9 and 13 use POC0 806 as reference picture, while other regions use POC1 808 as reference picture. In the codecs such as VVC where reference pictures are limited to have same picture number, both reference pictures may be included in the reference picture list of all regions, but in different orders. For example, for regions 9 and 3 in POC2 810, reference picture list may be set to {POC0 806, POC1 808}, and for the rest of the regions it may be set to {POC1 808, POC0 806}.

In the embodiment according to FIG. 8*b*, coding of the low quality regions (in skip mode) requires resampling of the reference picture, e.g., POC0. This redundant resampling may be needed to be done in each picture.

In an embodiment, to achieve the single decoder representation without need for overlaying, redundant resampling of POC0 806, and inserting redundant picture in reference frame list, an example encoding arrangement as shown in FIG. 8*c* may be used. In this embodiment, each picture representing the whole image, and the received high quality (e.g., representation2 704) regions are accumulatively kept in that picture, and the rest of the image is represented with lower quality (e.g., representation1 702). In this case, different regions in each picture are coded using the previous picture as reference picture. Hence, a first frame (e.g., POC1 808) uses POC0 806 and reference frame; and reference picture resampling in performed once. Other pictures are encoded using their previous picture, so no reference picture resampling is needed. In an example embodiment, the image of representation1 702 is encoded as a first picture of the bitstream, which may be denoted as POC0 806 in this example, but embodiments are not limited to any particular picture order count (POC) value or the presence of POC in the coding format. In an example embodiment, high quality regions are coded normally using the previously coded low quality regions, and other regions or group of regions in each POC are encoded based on the previously coded picture in a mode with the lowest possible bit (e.g., skip mode with no residual), for example just to copy the samples from previous picture to this picture. To achieve this very low bit encoding, quantization parameter may be set to maximum value. For these very low bit encoded regions, loop filters such as deblocking filter, sample adaptive offset, and adaptive loop filer may be disabled. Coding in skip mode requires minimum number of bits and is equivalent of copy the content from previous picture (after resampling if needed). For example, regions 10, 11, 14 and 15 are encoded in a picture (denoted as POC1 808), by using the representation1 702 of POC0 806 as a reference picture. The other regions of POC1 are encoded in skip mode with no residual, by using the representation1 702 of POC0 806 as a reference picture. Similarly, regions 9 and 13 are encoded in a picture (denoted as POC2 810) by using POC1 808 as a reference picture; and other regions of POC2 are encoded in skip mode with no residual, by using the POC1 808 as a reference picture. As a result, regions 10, 11, 14, and 15 in POC2 are copied from corresponding high quality regions in POC1, and the remaining regions (e.g., regions 1-8, 12, and 16) are copied from corresponding low quality regions in POC1.

Regions 12 and 16 are encoded in a picture (denoted as POC3 812) by using POC2 810 as a reference picture, and regions 9-11, and 13-15 are copied from corresponding high quality regions in POC2, and regions 1-8 are copied from corresponding low quality regions in POC2 using skip mode with no residual; regions 5, 6, 7, and 8 are encoded in a picture (denoted as POC4 814) by using the POC3 812 as a reference picture, and regions 9-16 are copied from corresponding high quality regions in POC2 810, and regions 1-4 are copied from corresponding low quality regions in POC2 810 using skip mode with no residual; regions 1, 2, 3, and 4 are encoded in a picture (denoted as POC5 816) by using the POC4 814 as a reference picture, and regions 5-16 are copied from corresponding high quality regions in POC2 810. In this embodiment, the reference numbers POC0 806 to POC5 816 refer to encoded pictures denoted as the POC values, not the POC values. In an example embodiment, such an encoding may be achieved, for example, by using a scaling window concept of the VVC specification. Although the embodiments specified here uses VVC scaling windows as an example, the embodiments are applicable to any encoding configuration/video codec specification which allows for such an encoding of regions or pictures with different resolution. In this case, scaling window may not be signaled in the bitstream, so the scaling window in each picture is inferred to cover the whole picture.

In an embodiment, each encoded picture/region of a POC position may then encapsulated in an image item, for example, an image item of a HEIF file. In the examples of the representation1 702 is encapsulated in an image item A 818 and similarly different regions of the representation2 704 are encapsulated in image item B 820 to image item F 828. In an embodiment, as the image item B 820 to image item F 828 depends on image item A 818 for decoding, the image item B 820 to image item F 828 are predictively coded image items.

In an embodiment, to achieve progressive rendering for such an encoding and encapsulating scheme, the content author, entity, or apparatus may have to additionally signal or write in a container file, for example, a HEIF file, a derived image item, such as an overlay derived image item or a grid derived image item. In an embodiment, the overlay derived image item or a grid derived image item includes the image items and the predictively coded image items in their progressive rendering order. Referring to, for example, FIG. 8a, an overlay derived image item may use image item A 818 to image item F 828 as input images. When the overlay derived image item is rendered progressively, the image item A 818 would first be scaled up to the size of the display window and displayed, followed by sequential displaying of the image item B 820 to image item F 828 overlaid on the same display window. Similarly, a grid image item may use image item B 820 to image item F 828 as input images. Progressive rendering of the grid image item may cause sequential displaying of image item B 820 to image item F 828 on the same display window.

In an embodiment, the content author, entity, or apparatus may signal or write in a container file (for example, a HEIF file), a progressive derived image item property ('prdi') to the said overlay derived image item or a grid derived image item. In an example embodiment, one or more input images to the overlay derived image item or a grid derived image item, as defined in progressive derived image item property, form a rendering step. For example, the image item C 822 and image item D 824 may jointly form a rendering step, while all other input images may be a rendering step on its own.

In an embodiment, the content author, entity, or apparatus may signal or write in a container file (for example a HEIF file), that a single decoder may decode both the representation1 702 and the representation2 704 of the image. In an embodiment, a new item property referred to as the single stream item property, is defined. Hereafter, the 4cc value of 'sstr' may be used as the item property type of the single stream item property, but it needs to be understood that any other valid 4cc value may be used. In an embodiment, the single stream item property indicates that input images of a derived image item, for example, the overlay derived image item or a grid derived image item, may be concatenated in coded domain and be decoded by a single decoder instance without any reinitialization of the decoder.

In an embodiment, the concatenation of a bitstream from a derived image item that has a 'sstr' item property may be performed as follows. The bitstream is initially empty. Each input image item of the derived image item is added into the bitstream in the order of input images as follows:

when an input image item is a coded image item that is not predictively coded, it is added to the bitstream as such.
when an input image item is a derived image item, the process is executed recursively.
when an input image item is a predictively coded image item, all the referenced image items are included in the bitstream in their referencing order (and when the referenced image items are themselves predictively coded image items, the process is executed recursively).

When an image item may be included in the bitstream as an input image item for a derived image item or as a referenced image item of a predictively coded image item but the image item is already present in the bitstream, the image item is not included in the bitstream again. The resulting bitstream is conforming to the item type of the input image items.

In an embodiment, the content author, entity, or apparatus may signal or write in a container file only a single copy of the image item with independent representation, for example, the image item A 818 of POC0 806 with the representation1 702. In an embodiment, the bitstream from the predictively coded image items B to F are concatenated with bitstream from the image item A 818 and decoded as a single bitstream.

In an embodiment, the single stream item property may be a non-essential item property, e.g., it is not required to be parsed by a reader/player.

In an embodiment, the single stream item property is specified as follows:
Single stream item information property
Definition
Box type: 'sstr'
Property type: Descriptive item property
Container: ItemPropertyContainerBox
Mandatory (per item): No
Quantity (per item): Zero or one for a derived image item
The single stream item information property describes that the input images to a derived image item, when concatenated, forms a single decodable stream. The order in which image items are listed in the 'dimg' item reference is the order in which the input image items are to be concatenated to obtain a single decodable stream.

In an embodiment, The SingleStreamItemInformationProperty is intended to be used with derived image items using several input images. An example, syntax of the SingleStreamItemInformationProperty is provided below:

```
aligned(8) class SingleStreamItemInformationProperty
extends ItemFullProperty('sstr', version = 0, flags = 0){
}
```

In an embodiment, the single stream item property is specified as follows:
Definition
Box type: 'sstr'
Property type: Descriptive item property
Container: ItemPropertyContainerBox
Mandatory (per item): No
Quantity (per item): Zero or one for a derived image item
The Single stream item information property describes hat the input images to a derived image item when concatenated forms a single decodable stream.

The order in which image items are listed in SingleStreamItemInformationProperty is the order in which the input image items are to be concatenated to obtain a single decodable stream.

In an embodiment, the SingleStreamItemInformationProperty is intended to be used with derived image items using several input images. An example, syntax of the SingleStreamItemInformationProperty is provided below:

```
aligned(8) class SingleStreamItemInformationProperty
extends ItemFullProperty('sstr', version = 0, flags = 0){
    unsigned int(16) item_count;
    for (i=0; i < step_count; i++)
        unsigned int(16) item_id;
}
```

Example semantics of the SingleStreamItemInformationProperty are provided below:
item_count is the number of input image items that is to be concatenated to form a single stream; and
item_id is the id of the image item that is to be concatenated to form a single stream.

In an embodiment, a reader or player concatenates the input images of the said overlay derived image item or a grid derived image item to a single bitstream. For example, referring to FIG. 8a with encoded pictures POC0 806, . . . , and POC5 816; the picture denoted as POC0 806 is decoded once and kept in the decoded picture buffer until the picture denoted as POC5 816 has been decoded.

In the absence of the said single stream item property, the player decodes each input image of the said overlay derived image item or a grid derived image item separately, which causes decoding of picture POC0 multiple times.

In an embodiment, the content author, entity, or apparatus may signal or write in a container file (for example, a HEIF file), the information that the output of an image item is identical to the output of a derived image item associated with progressive derived image item property.

In an embodiment, a new entity group referred to as identical images entity group may be defined. Hereafter, the 4cc value 'idtc' may be used as the entity group type of the identical images entity group, but it needs to be understood that any other valid 4cc value may be used. In an embodiment, each image item listed in the said identical images entity group results into an identical output image.

In an embodiment, a player may only process one image item in the said identical images entity group. In an embodiment, for progressive rendering, a derived image item with associated 'prdi' progressive derived image item property can be chosen. In an embodiment, a player, entity, or apparatus which does not support or does not decide to provide progressive rendering mechanism due to different playback conditions may choose another image item of the same 'idtc' identical images entity group.

Identical Image Entity Group

The Identical image entity group (with a grouping_type 'idtc') signals a set of image items where each image item produces an identical output image.

A 'idtc' entity group may contain only image items, and not tracks.

It may be required that image items of the same 'idtc' entity group are members of the same 'altr' entity group. This requirement may guarantee that legacy players without capability of processing 'idtc' entity groups treat the image items as alternatives to be displayed.

In an example embodiment, there is a 'grid' derived image item that uses a set of 'vvc1' VVC subpicture image items as input, each including a different subpicture ID. In an example embodiment, the 'prdi' progressive derived image item property is associated with the said 'grid' derived image item to indicate that the input images to the said the said 'grid' derived image item are in progressive rendering order. In an example embodiment, there is a VVC base item that includes the said VVC subpicture image items by reference. In an example embodiment, 'idtc' identical images entity group contains the 'grid' derived image item and the VVC base item.

Figure 9:
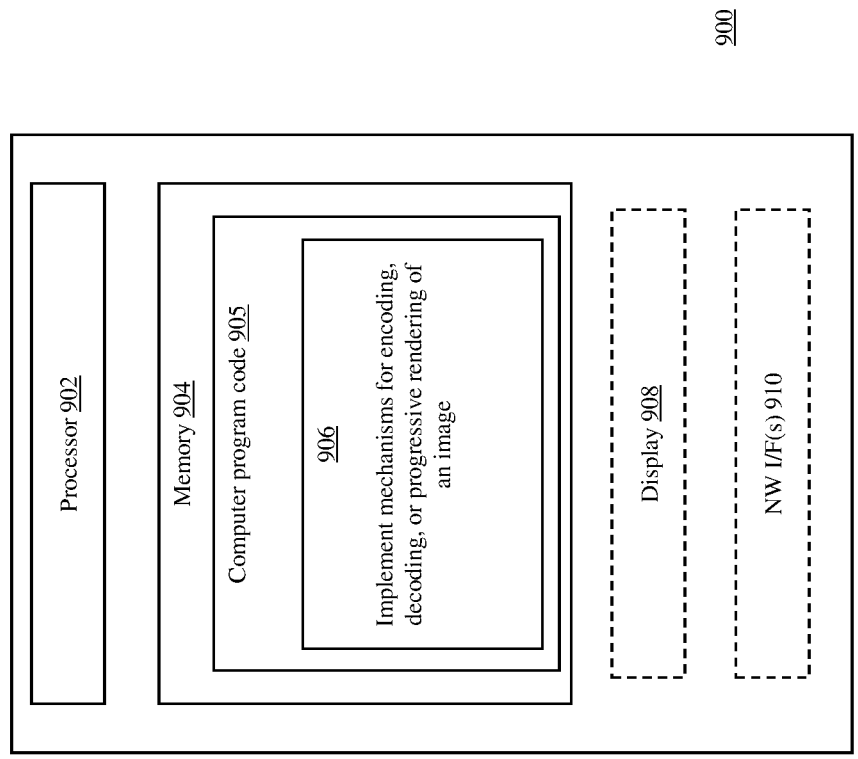
FIG. 9 is an example apparatus caused to implement mechanisms for encoding or decoding an image, in accordance with an embodiment.

FIG. 9 is an example apparatus 900, which may be implemented in hardware, configured to implement mechanisms for progressive rendering in an image file format, based on the examples described herein. The apparatus 900 comprises a processor 902, at least one non-transitory memory 904 including computer program code 905, wherein the at least one memory 904 and the computer program code 905 are configured to, with the at least one processor 902, cause the apparatus to implement mechanisms for progressive rendering in an image file format. The apparatus 900 optionally includes a display 908 that may be used to display content during rendering. The apparatus 900 optionally includes one or more network (NW) interfaces (I/F(s)) 910. The NW I/F(s) 910 may be wired and/or wireless and communicate over the Internet/other network(s) via any communication technique. The NW I/F(s) 910 may comprise one or more transmitters and one or more receivers. The N/W I/F(s) 910 may comprise standard well-known components such as an amplifier, filter, frequency-converter, (de)modulator, and encoder/decoder circuitry(ies) and one or more antennas.

The apparatus 900 may be a remote, virtual or cloud apparatus. The apparatus 900 may be either a coder or a decoder, or both a coder and a decoder. The at least one memory 904 may be implemented using any suitable data storage technology, such as semiconductor based memory devices, flash memory, magnetic memory devices and systems, optical memory devices and systems, fixed memory and removable memory. The at least one memory 904 may comprise a database for storing data. The apparatus 900 need not comprise each of the features mentioned, or may comprise other features as well. The apparatus 900 may correspond to or be another embodiment of the apparatus 50 shown in FIG. 1 and FIG. 2, or any of the apparatuses shown in FIG. 3. The apparatus 900 may correspond to or be another embodiment of the apparatuses shown in FIG. 16, including UE 110, RAN node 170, or network element(s) 190.

Figure 10:
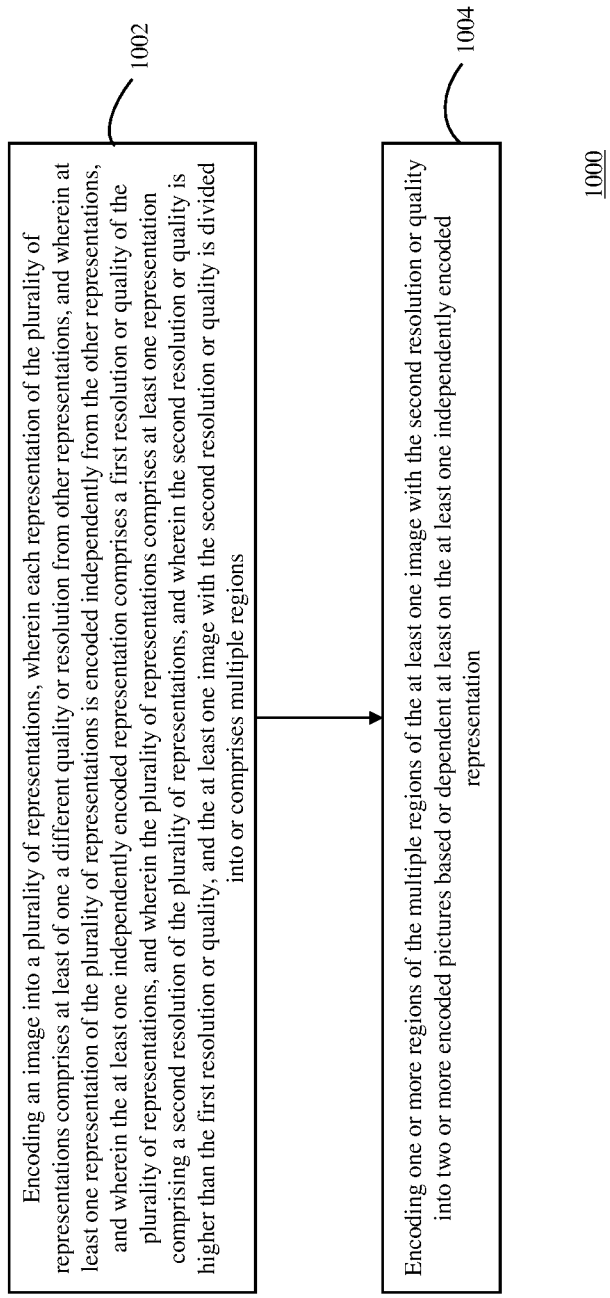
FIG. 10 is an example method for encoding an image, in accordance with an embodiment.

FIG. 10 is an example method 1000 for encoding an image, in accordance with an embodiment. As shown in block 906 of FIG. 9, the apparatus 900 includes means, such as the processing circuitry 902 or the like, for implementing mechanisms for encoding an image. At 1002, the method 1000 includes encoding an image into a plurality of representations. Each representation of the plurality of representations include at least of one a different quality or resolution from other representations, where at least one representation of the plurality of representations is encoded independently from the other representations. The at least one independently encoded representation include a first resolution or quality of the plurality of representations. Further, the plurality of representations includes at least one representation including a second resolution or quality of the plurality of representations, and the at least one image with second resolution is divided into or includes multiple regions. The second resolution or quality is higher than the first resolution or quality. At step 1004, the method 1000 includes encoding one or more regions of the multiple regions of the at least one image with the second resolution into two or more encoded pictures based or dependent at least on the at least one independently encoded representation.

In an embodiment, the first resolution or quality includes a lowest resolution or quality; and the second resolution or quality includes a highest resolution or quality.

Figure 11:
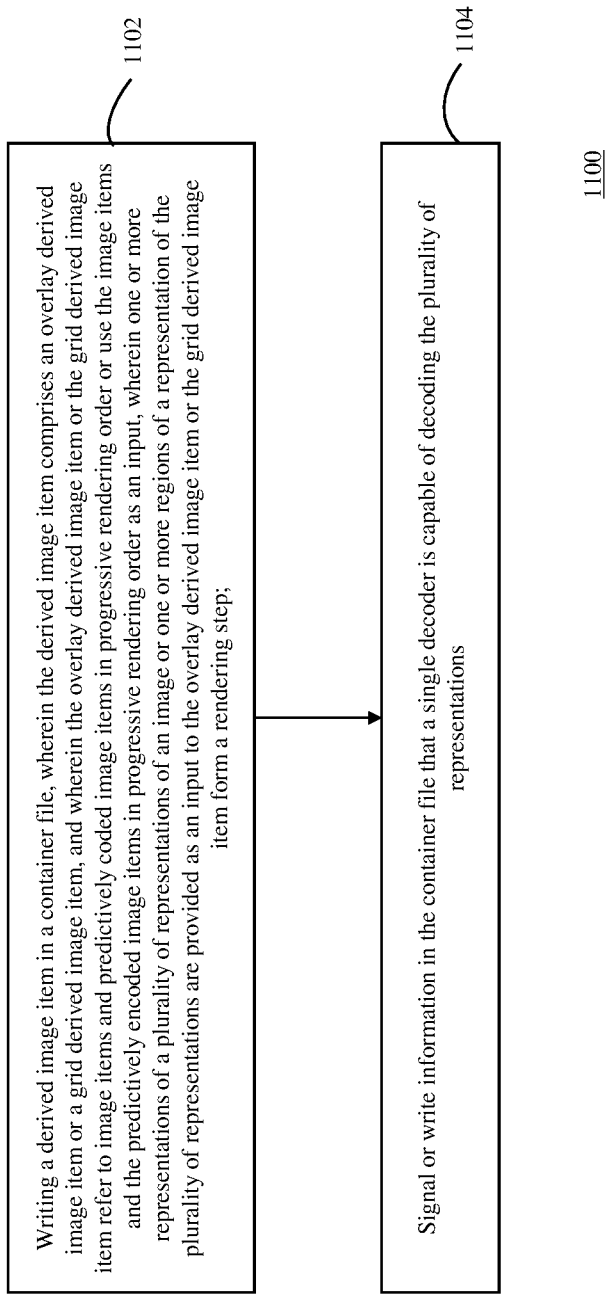
FIG. 11 is an example method for encoding an image, in accordance with another embodiment.

FIG. 11 is an example method 1100 for encoding an image, in accordance with another embodiment. As shown in block 906 of FIG. 9, the apparatus 900 includes means, such as the processing circuitry 902 or the like, for implementing mechanisms for encoding an image. At 1102, the method 1100 includes writing a derived image item in a container file, where the derived image item includes an overlay derived image item or a grid derived image item. The overlay derived image item or the grid derived image item refer to image items and predictively coded image items in progressive rendering order or use the image items and the predictively encoded image items in progressive rendering order as an input. Further, one or more representations of a plurality of representations of an image or one or more regions of a representation of the plurality of representations are provided as an input to the overlay derived image item or the grid derived image item form a rendering step. At 1104, method 1100 includes signaling or writing information in the container file that a single decoder is capable of decoding the plurality of representations.

Figure 12:
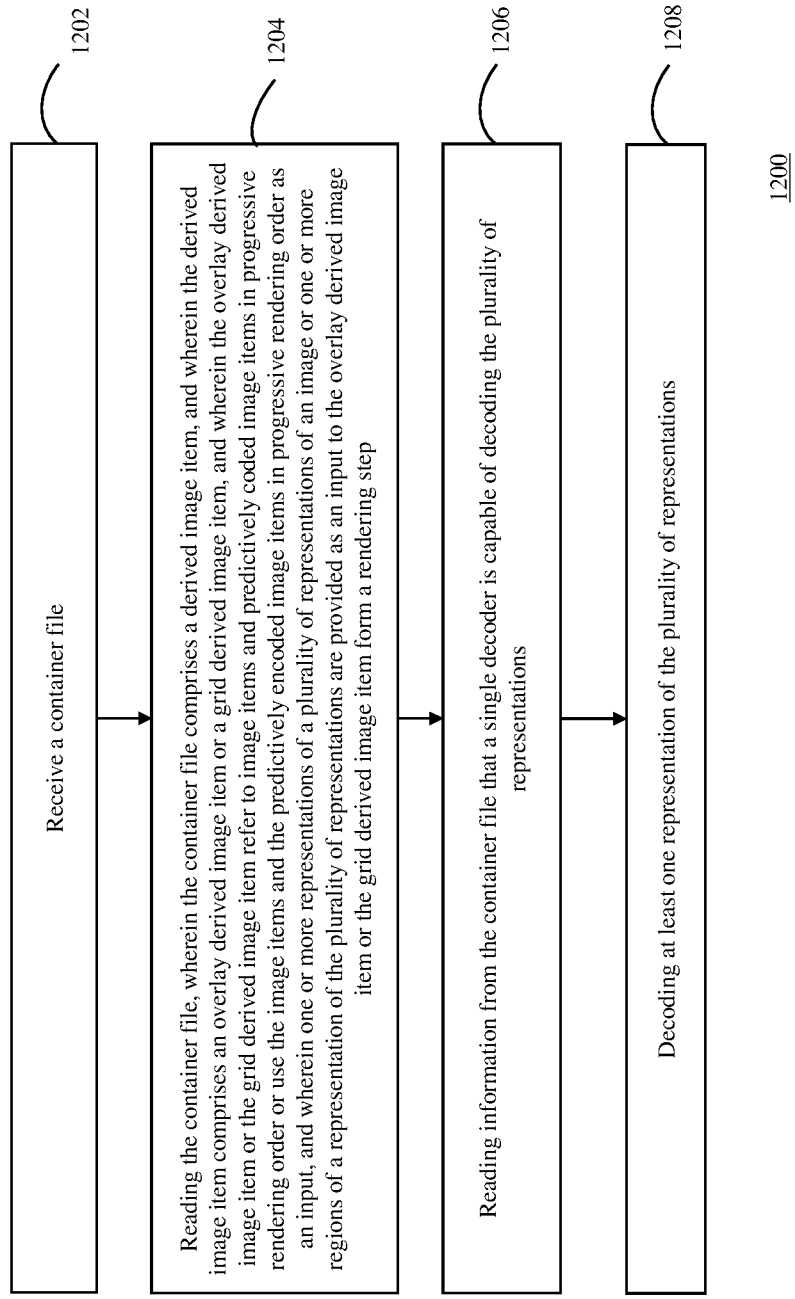
FIG. 12 is an example method for decoding an image, in accordance with an embodiment.

FIG. 12 is an example method 1200 for decoding an image, in accordance with an embodiment. As shown in block 906 of FIG. 9, the apparatus 900 includes means, such as the processing circuitry 902 or the like, for implementing mechanisms for decoding an image. At 1202, the method 1200 includes receiving a container file. At 1204, the method 1200 includes reading the container file, where the container file includes a derived image item. The derived image item includes an overlay derived image item or a grid derived image item, and where the overlay derived image item or the grid derived image item refer to image items and predictively coded image items in progressive rendering order or use the image items and the predictively encoded image items in progressive rendering order as an input. Further, one or more representations of a plurality of representations of an image or one or more regions of a representation of the plurality of representations are provided as an input to the overlay derived image item or the grid derived image item form a rendering step.

At step 1206, the method 1200 includes reading information from the container file that a single decoder is capable of decoding the plurality of representations. At 1208, the method includes decoding at least one representation of the plurality of representations.

Figure 13:
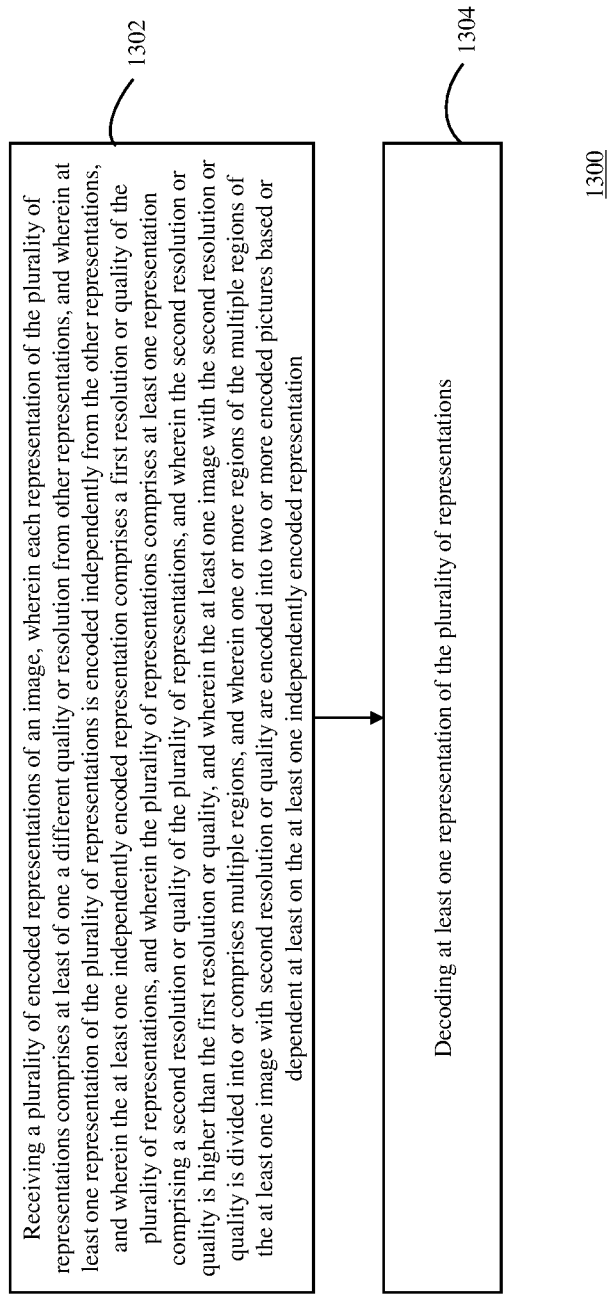
FIG. 13 is an example method for decoding an image, in accordance with another embodiment.

FIG. 13 is an example method 1300 for decoding an image, in accordance with another embodiment. As shown in block 906 of FIG. 9, the apparatus 900 includes means, such as the processing circuitry 902 or the like, for implementing mechanisms for decoding an image. At 1302, the method 1300 includes receiving a plurality of encoded representations of an image. Each representation of the plurality of representations includes at least of one a different quality or resolution from other representations, where at least one representation of the plurality of representations is encoded independently from the other representations. The at least one independently encoded representation includes a first resolution or quality of the plurality of representations. Further the plurality of representations includes at least one representation including a second resolution of the plurality of representations. The second resolution or quality is higher than the first resolution or quality. The at least one image with the second resolution is divided into or includes multiple regions, where one or more regions of the multiple regions of the at least one image with the second resolution are encoded into two or more encoded pictures based or dependent at least on the at least one independently encoded representation. At 1304, the method 1300 includes decoding at least one representation of the plurality of representations.

In an embodiment, the first resolution or quality includes a lowest resolution or quality; and the second resolution or quality includes a highest resolution or quality.

FIG. 14 is an example method 1400 for encoding an image, in accordance with another embodiment. As shown in block 906 of FIG. 9, the apparatus 900 includes means, such as the processing circuitry 902 or the like, for implementing mechanisms for encoding an image. At 1402, the method 1400 includes defining a derived image item. In an embodiment, the derived image item are defined in a container file. At 1404, the method 1400 includes defining a single stream item property. The single stream item property is used to indicate that input image items of the derived image item are concatenated in encoded domain to obtain a single stream and are to be decoded by a single decoder.

In an embodiment, an order in which input image items are listed in an item reference is the order in which the input image items are to be concatenated to obtain the single stream.

In an embodiment, the derived image items comprises a second input image item. When the second input image item is a predictively encoded image item, each of referenced image items of the second input image item is included in the single stream in referencing order, unless a reference image item is already included in the single stream.

In an embodiment, a four character code (4cc) value of 'sstr' as an item property type of the single stream item property.

FIG. 15 is another example method 1500 for decoding an image, in accordance with another embodiment. As shown in block 906 of FIG. 9, the apparatus 900 includes means, such as the processing circuitry 902 or the like, for implementing mechanisms for decoding an image. At 1502, the method 1500 includes receiving a single stream item property. The single stream item property is used to indicate that input image items of a derived image item are concatenated in encoded domain to obtain a single stream and are to be decoded by a single decoder. At step 1504, the method 1500 includes reading the single stream item property. At step 1506, the method 1500 includes concatenating the input image items of the derived image item.

In an embodiment, an order in which input image items are listed in an item reference is the order in which the input image items are to be concatenated to obtain the single stream.

In an embodiment, the derived image items comprises a second input image item. When the second input image item is a predictively encoded image item, each of referenced image items of the second input image item is included in the single stream in referencing order, unless a reference image item is already included in the single stream.

Figure 16:
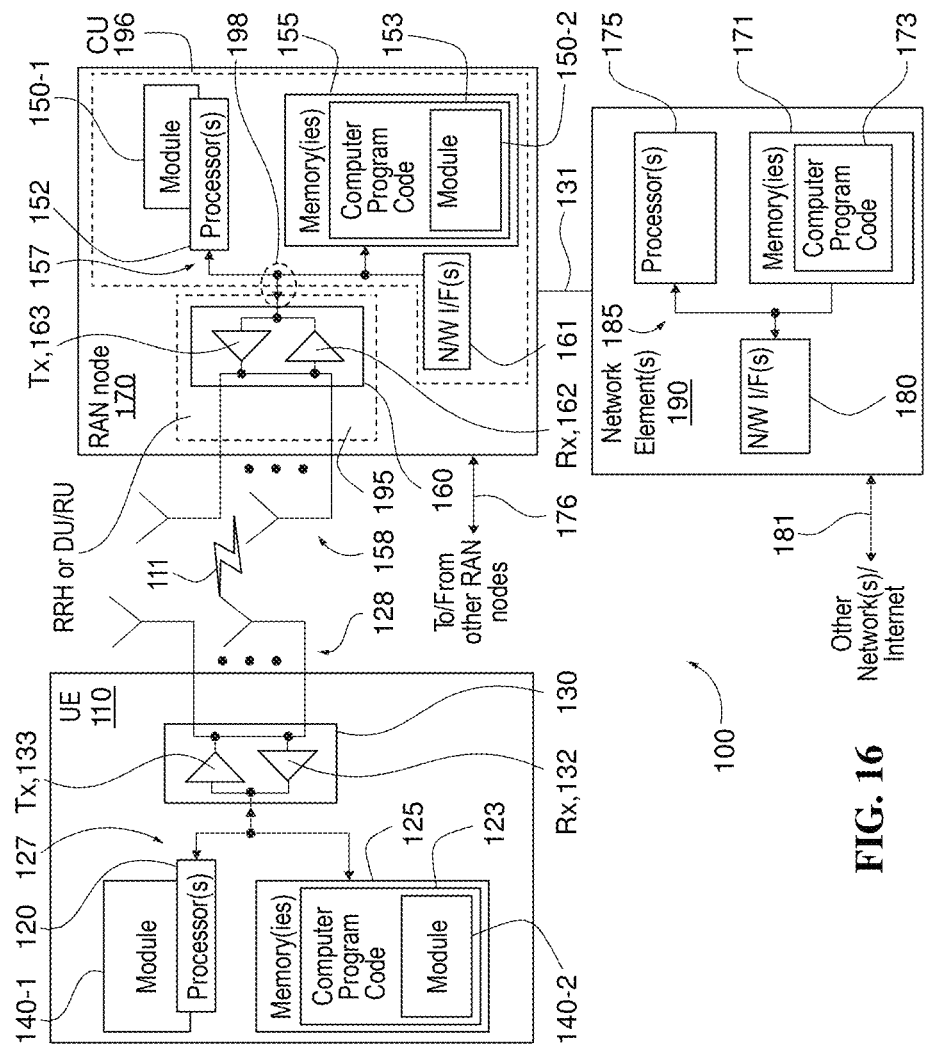
FIG. 16 is a block diagram of one possible and non-limiting system in which the example embodiments may be practiced.

Turning to FIG. 16, this figure shows a block diagram of one possible and non-limiting system in which the example embodiments may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access by wireless devices such as the UE 110 to the wireless network 100. The RAN node 170 may be, for example, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE, and connected via the NG interface to a 5GC (such as, for example, the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting radio resource control (RRC), SDAP and PDCP protocols f51 of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, for example, as part of a RU, but some examples of this may have the transceiver 160 as part of a separate RU, for example, under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, for example, link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, for example, fiber optic cable or other suitable network connection to connect the other elements (for example, a central unit (CU), gNB-CU) of the RAN node 170 to the RRH/DU 195. Reference 198 also indicates those suitable network link(s)

It is noted that description herein indicates that "cells" perform functions, but it should be clear that equipment which forms the cell may perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (for example, the Internet). Such core network functionality for 5G may include access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. These are merely example functions that may be supported by the network element(s) 190, and note that both 5G and LTE functions might be supported. The RAN node 170 is coupled via a link 131 to the network element 190. The link 131 may be implemented as, for example, an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, network element(s) 190, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

One or more of modules 140-1, 140-2, 150-1, and 150-2 may be configured to implement mechanisms for progressive rendering, encoding, or decoding an image based on the examples described herein. Computer program code 173 may also be configured to implement mechanisms for encoding, decoding, or progressive rendering an image based on the examples described herein.

As described above, FIGS. 10, 11, 12, and/or 15 include a flowchart of an apparatus (e.g. 50, 600, or 900), method, and computer program product according to certain example embodiments. It will be understood that each block of the flowchart(s), and combinations of blocks in the flowchart(s), may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory (e.g. 58, 125, 604 or 904) of an apparatus employing an embodiment of the present invention and executed by processing circuitry (e.g. 56, 120, 602 or 902) of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

A computer program product is therefore defined in those instances in which the computer program instructions, such as computer-readable program code portions, are stored by at least one non-transitory computer-readable storage medium with the computer program instructions, such as the computer-readable program code portions, being configured, upon execution, to perform the functions described above, such as in conjunction with the flowchart(s) of FIGS. 10, 11, 12, and/or 15. In other embodiments, the computer program instructions, such as the computer-readable program code portions, need not be stored or otherwise embodied by a non-transitory computer-readable storage medium, but may, instead, be embodied by a transitory medium with the computer program instructions, such as the computer-readable program code portions, still being configured, upon execution, to perform the functions described above.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, may be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Accordingly, the description is intended to embrace all such alternatives, modifications and variances which fall within the scope of the appended claims. Although specific terms are employed herein, they are used in a generic and descriptive sense only and not for purposes of limitation.

It should be understood that the foregoing description is only illustrative. Various alternatives and modifications may be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims

What is claimed is:

1. An apparatus comprising:
    at least one processor; and
    at least one non-transitory memory including computer program code;
    wherein the at least one memory and the computer program code are configured to, with the at least one processor, cause the apparatus at least to perform:
    define a derived image item; and
    define a single stream item property, wherein the single stream item property is used to indicate that input image items of the derived image item are concatenated in encoded domain to obtain a single stream and are to be decoded by a single decoder, and wherein a four character code (4cc) value of 'sstr' is used as an item property type of the single stream item property.

2. The apparatus of claim 1, wherein an order in which the input image items are listed in an item reference is the order in which the input image items are to be concatenated to obtain the single stream.

3. The apparatus of claim 1, wherein the derived image item comprises a first input image item, and wherein when the first input image item is an encoded image item that is not predictively encoded, the first input image item is added to the single stream.

4. The apparatus of claim 1, wherein the derived image item comprises a second input image item, and wherein when the second input image item is a predictively encoded image item, each of referenced image items of the second input image item is included in the single stream in referencing order, unless a reference image item is already included in the single stream.

5. The apparatus of claim 1, wherein apparatus is further caused to signal or write in a container file information that an output of the input image items is identical to an output of the derived image item associated with a progressive derived image item property.

6. The apparatus of claim 5, wherein the apparatus is further caused to define an identical images entity group, wherein each image comprised in the identical images entity group results into an identical output image.

7. The apparatus of claim 1, wherein the apparatus is caused to define at least one of:
    an item count for keeping a count of number of input image items that are to be concatenated to form the single stream; or
    item identifier of the input image items that are to be concatenated to form the single stream.

8. An apparatus comprising:
at least one processor; and
at least one non-transitory memory including computer program code;
wherein the at least one memory and the computer program code are configured to, with the at least one processor, cause the apparatus at least to perform:
receive a single stream item property, wherein the single stream item property is used to indicate that input image items of a derived image item are concatenated in encoded domain to obtain a single stream and are to be decoded by a single decoder, and wherein a four character code (4cc) value of 'sstr' is used as an item property type of the single stream item property;
read the single stream item property; and
concatenate the input image items of the derived image item.

9. The apparatus of claim 8, wherein an order in which the input image items are listed in an item reference is the order in which the input image items are to be concatenated to obtain the single stream.

10. The apparatus of claim 8, wherein the derived image item comprises a first input image item, and wherein when the first input image item is an encoded image item that is not predictively encoded, the first input image item is added to the single stream.

11. The apparatus of claim 8, wherein the derived image item comprises a second input image item, and wherein when the second input image item is a predictively encoded image item, each of referenced image items of the second input image item is included in the single stream in referencing order, unless a reference image item is already included in the single stream.

12. A method comprising:
defining a derived image item; and
defining a single stream item property, wherein the single stream item property is used to indicate that input image items of the derived image item are concatenated in encoded domain to obtain a single stream and are to be decoded by a single decoder, and wherein a four character code (4cc) value of 'sstr' is used as an item property type of the single stream item property.

13. The method of claim 12, wherein an order in which the input image items are listed in an item reference is the order in which the input image items are to be concatenated to obtain the single stream.

14. The method of claim 12, wherein the derived image item comprises a first input image item, and wherein when the first input image item is an encoded image item that is not predictively encoded, the first input image item is added to the single stream.

15. The method of claim 12, wherein the derived image item comprises a second input image item, and wherein when the second input image item is a predictively encoded image item, each of referenced image items of the second input image item is included in the single stream in referencing order, unless a reference image item is already included in the single stream.

16. A method comprising:
receiving a single stream item property, wherein the single stream item property is used to indicate that input image items of a derived image item are concatenated in encoded domain to obtain a single stream and are to be decoded by a single decoder, and wherein a four character code (4cc) value of 'sstr' is used as an item property type of the single stream item property;
reading the single stream item property; and
concatenating the input image items of the derived image item.

17. The method of claim 16, wherein an order in which the input image items are listed in an item reference is the order in which the input image items are to be concatenated to obtain the single stream.

18. The method of claim 16, wherein the derived image item comprises a first input image item, and wherein when the first input image item is an encoded image item that is not predictively encoded, the first input image item is added to the single stream.

19. The method of claim 16, wherein the derived image item comprises a second input image item, and wherein when the second input image item is a predictively encoded image item, each of referenced image items of the second input image item is included in the single stream in referencing order, unless a reference image item is already included in the single stream.

\* \* \* \* \*